United States Patent [19]

Yasuoka et al.

[11] Patent Number: 4,885,766
[45] Date of Patent: Dec. 5, 1989

[54] REMOTE CONTROL DEVICE USING A TELEPHONE LINE

[75] Inventors: Norio Yasuoka; Takehiro Kobayashi; Nobuharu Hikida; Yasuyuki Hatakeyama; Yoshiyuki Aoto; Jiro Itogawa, all of Osaka, Japan

[73] Assignee: Sharp Kabushiki Kaisha, Osaka, Japan

[21] Appl. No.: 296,281

[22] Filed: Jan. 11, 1989

Related U.S. Application Data

[63] Continuation of Ser. No. 170,117, Mar. 16, 1988, abandoned, which is a continuation of Ser. No. 8,840, Jan. 30, 1987, abandoned.

[30] Foreign Application Priority Data

| Jan. 31, 1986 | [JP] | Japan | 61-20455 |
| Mar. 4, 1986 | [JP] | Japan | 61-47649 |
| May 14, 1986 | [JP] | Japan | 61-74709[U] |
| May 27, 1986 | [JP] | Japan | 61-122471 |
| May 27, 1986 | [JP] | Japan | 61-122470 |
| Jun. 30, 1986 | [JP] | Japan | 61-155782 |
| Jul. 1, 1986 | [JP] | Japan | 61-155678 |
| Aug. 13, 1986 | [JP] | Japan | 61-125000[U] |
| Sep. 16, 1986 | [JP] | Japan | 61-219011 |
| Dec. 10, 1986 | [JP] | Japan | 61-293767 |

[51] Int. Cl.$^4$ ........................................... H04M 11/00
[52] U.S. Cl. .................................... 379/105; 455/603
[58] Field of Search ................ 379/52, 102, 104, 105, 379/110, 95; 455/600, 603, 607

[56] References Cited

U.S. PATENT DOCUMENTS

| 4,456,793 | 6/1984 | Baker et al. | 379/61 X |
| 4,481,677 | 11/1984 | Li et al. | 455/617 |
| 4,498,196 | 2/1985 | Holoyda et al. | 455/603 X |
| 4,540,851 | 9/1985 | Hashimoto | 379/105 |
| 4,578,540 | 3/1986 | Borg et al. | |
| 4,625,080 | 11/1986 | Scott | 379/104 |
| 4,656,655 | 4/1987 | Hashimoto | 379/105 |
| 4,682,957 | 7/1987 | Young | 379/102 X |
| 4,748,654 | 5/1988 | Gray | 379/104 X |
| 4,809,359 | 2/1989 | Dockery | 455/603 |

FOREIGN PATENT DOCUMENTS 58-141044  8/1983  Japan ........................................ 455/603

OTHER PUBLICATIONS

Dance, "Multichannel Remote Control Systems", *Electron*, (GB), No. 153, (Nov. 7, 1978), pp. 33–34, 37.
Voelckes, "Home Automation on the Verge?", *The Institute*, (IEEE), Aug. 1987, p. 8.
Glasgal Communications, Inc., Northvale, N.J., "Data Communications Equipment and Supplies Summer Catalog–1985", pp. 68–72.

*Primary Examiner*—Keith E. George
*Attorney, Agent, or Firm*—Flehr, Hohbach, Test, Albritton & Herbert

[57] ABSTRACT

A remote control device stores commands which are received through a telephone line and transmits command signals to operate designated apparatus according to the stored commands. These command signals may be transmitted by infrared light or supersonic waves through one or more transmitters.

13 Claims, 23 Drawing Sheets

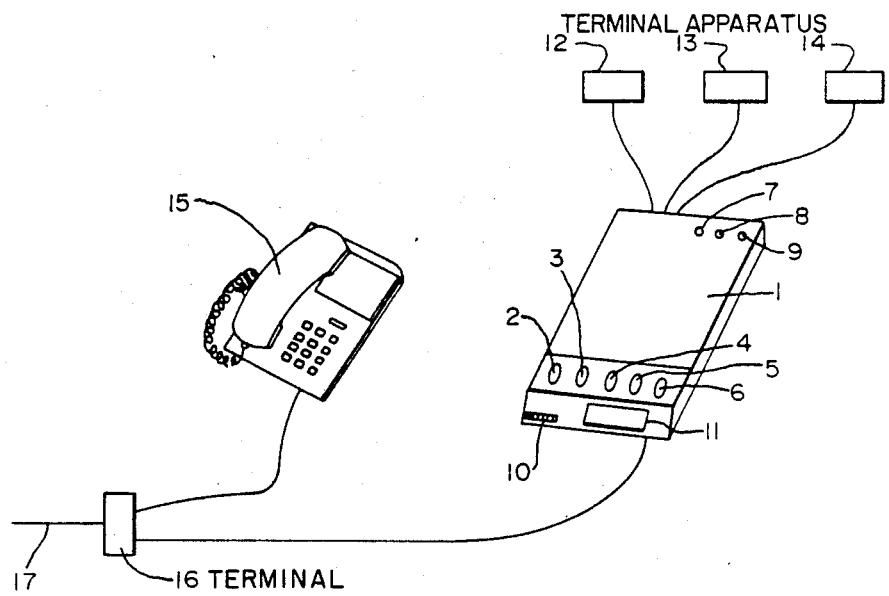
FIG.—1
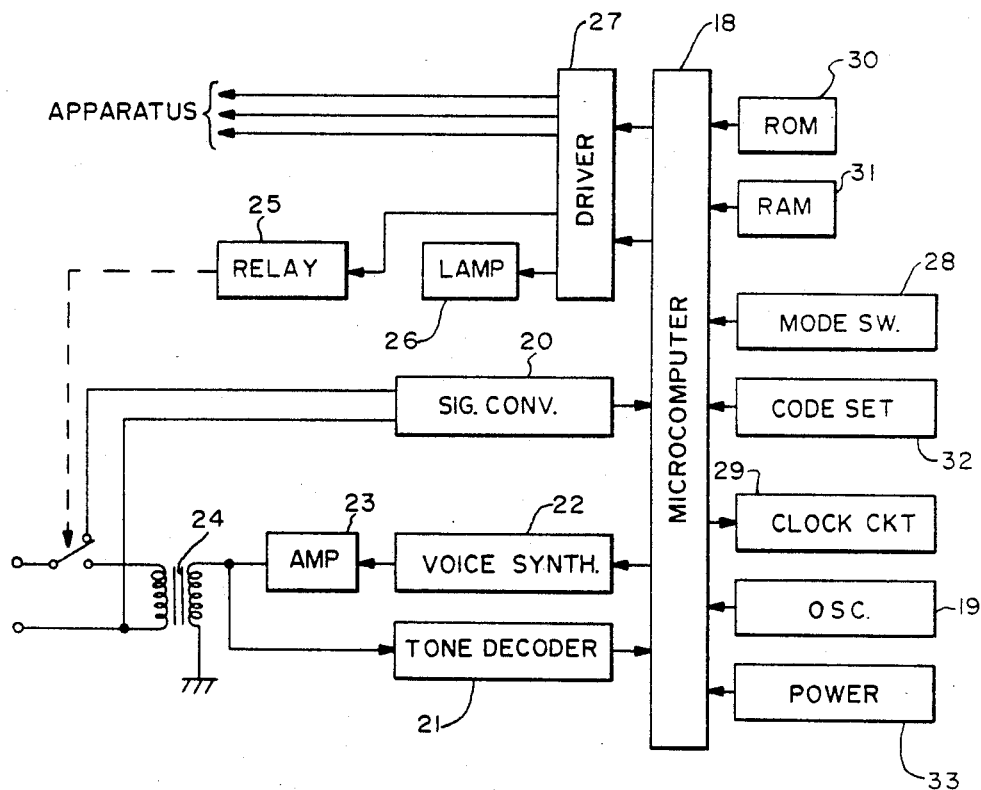
FIG.—2

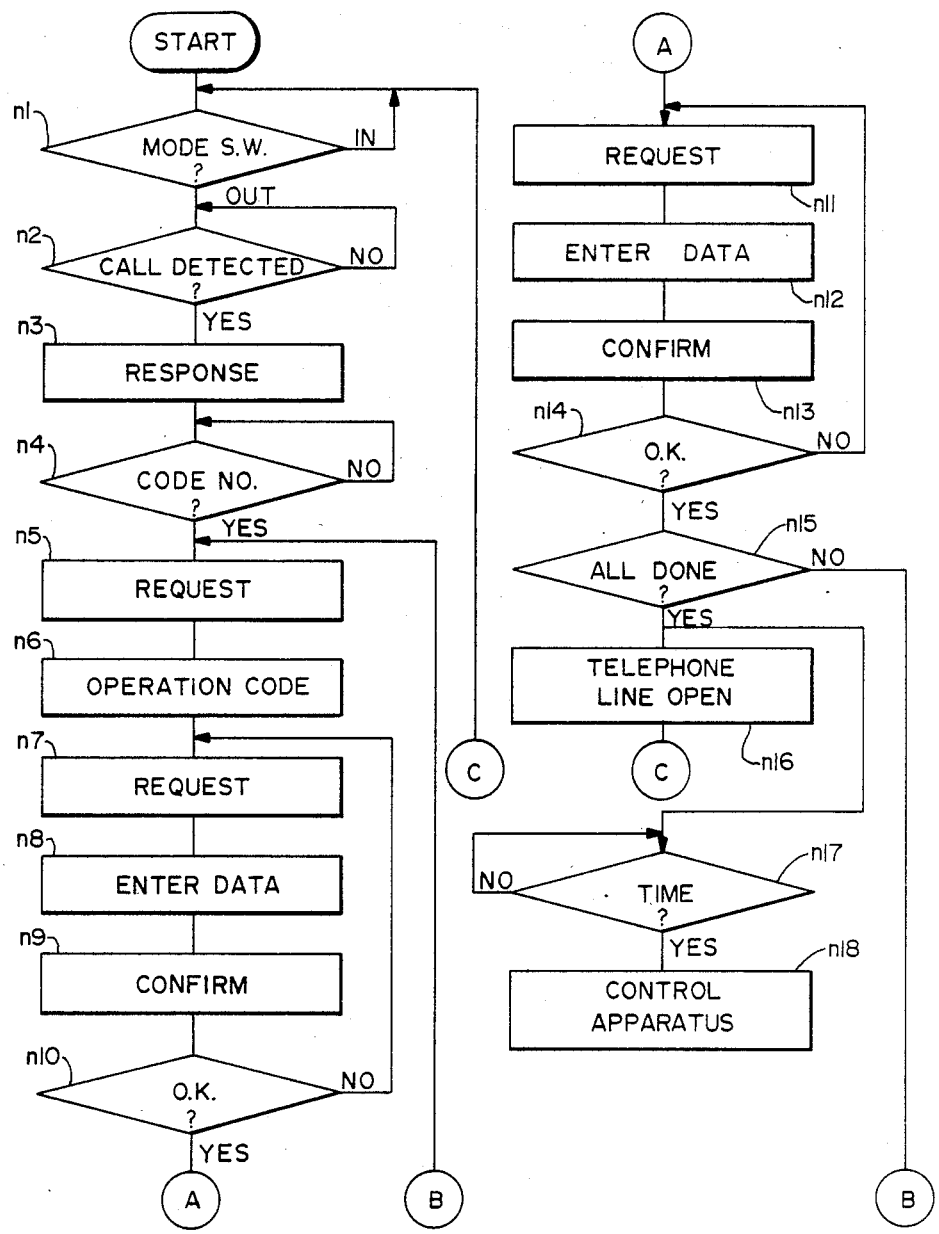
FIG.—3A  FIG.—3B

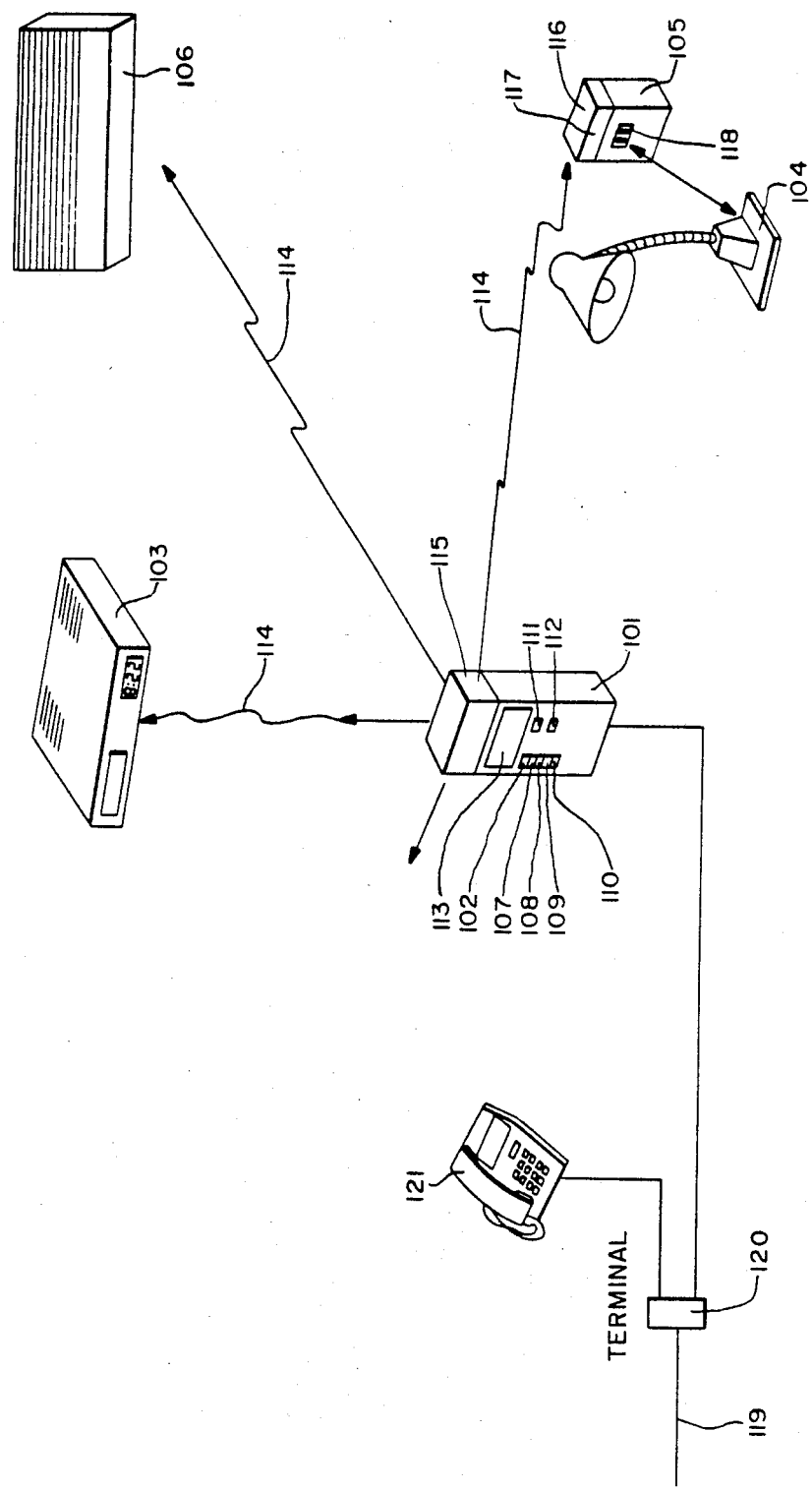
FIG.—4

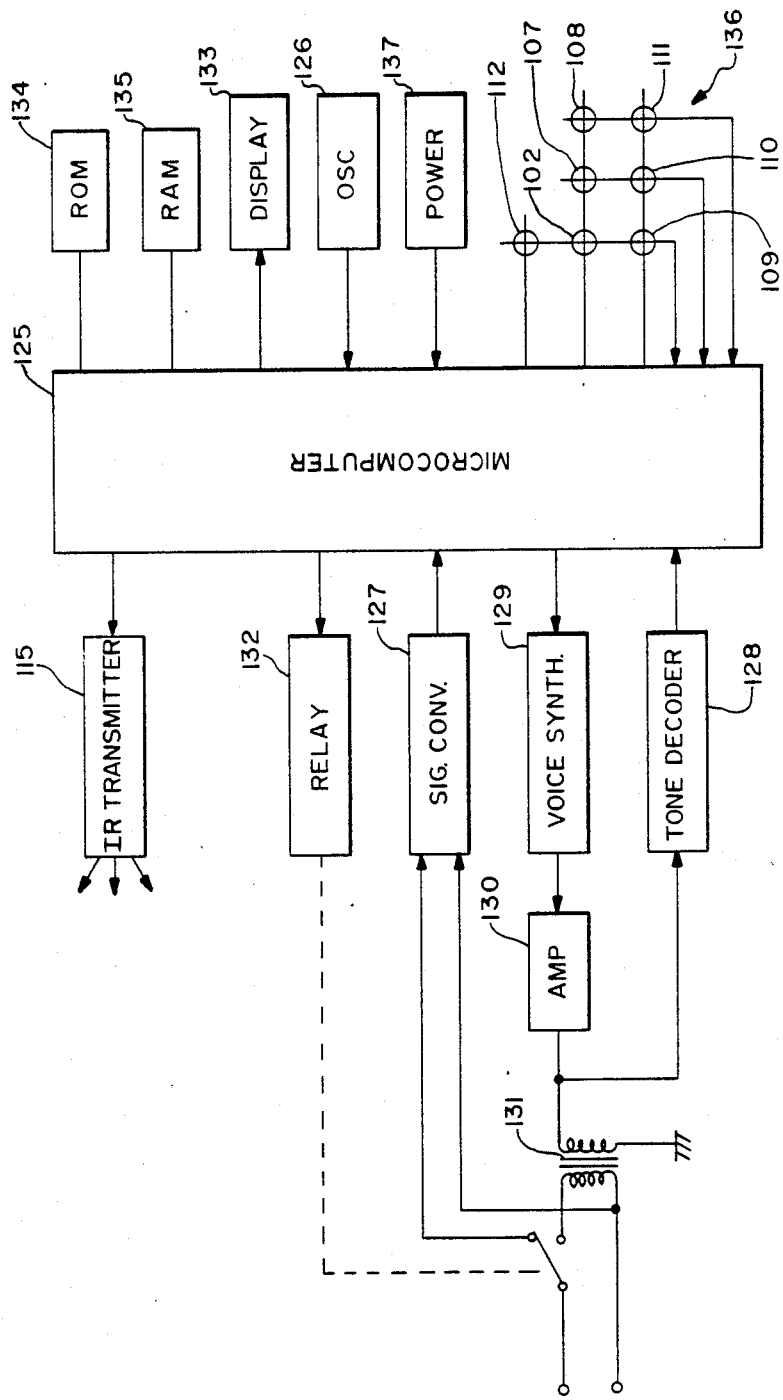
FIG.—5

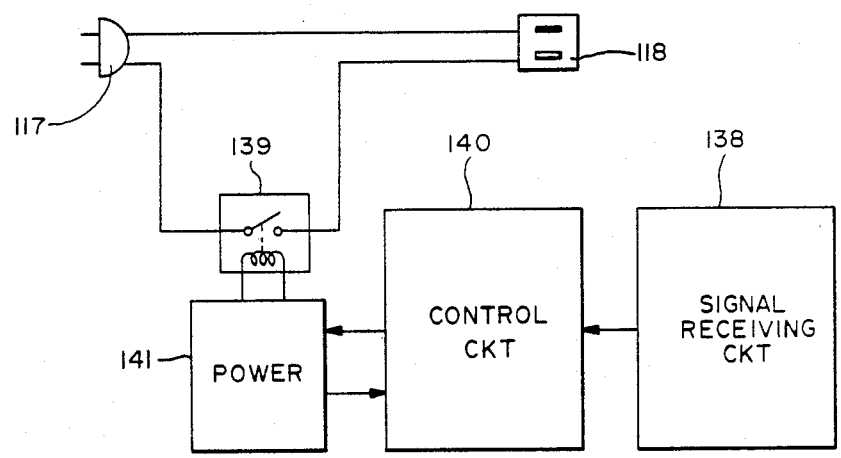
FIG.—6
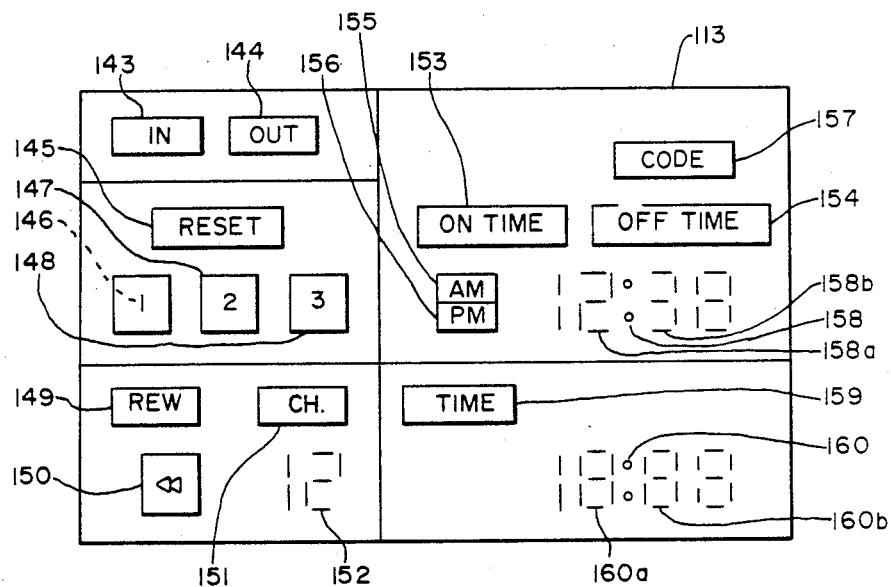
FIG.—7

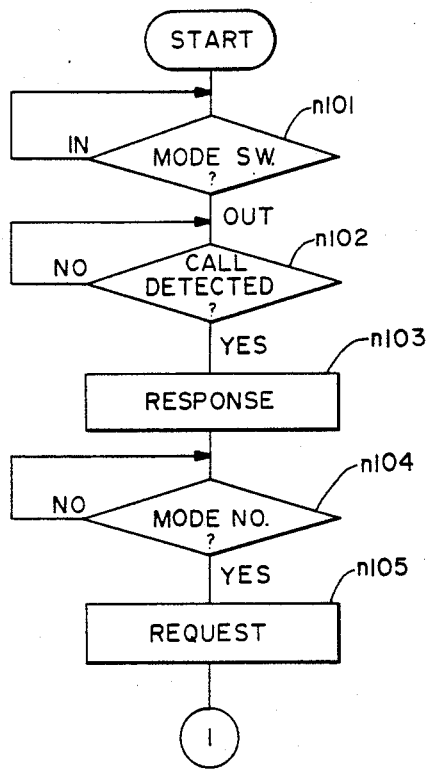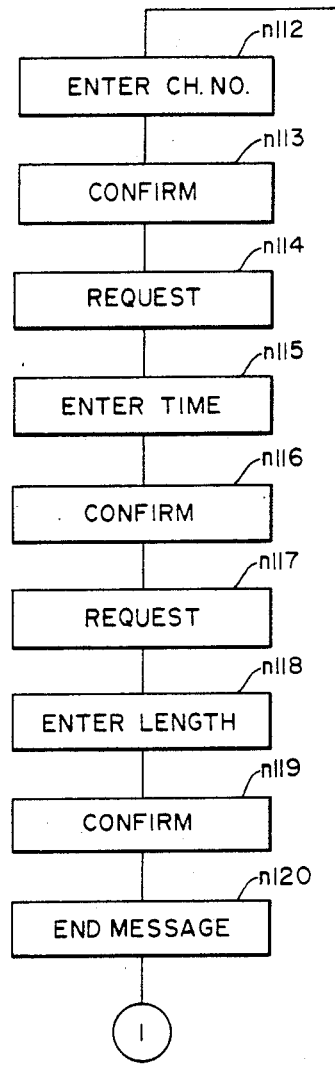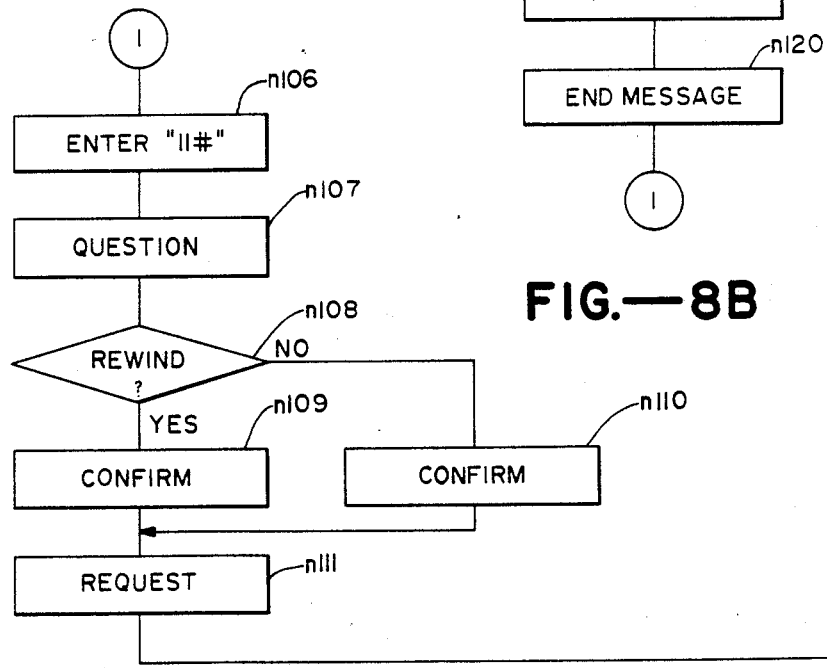
FIG.—8A
FIG.—8B

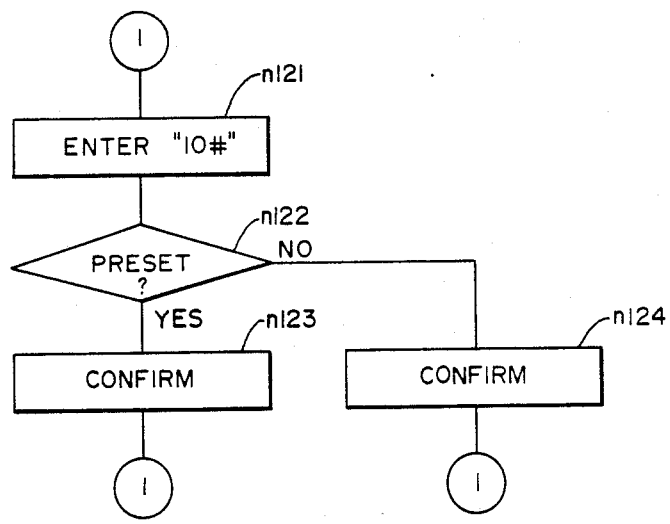
FIG.—8C
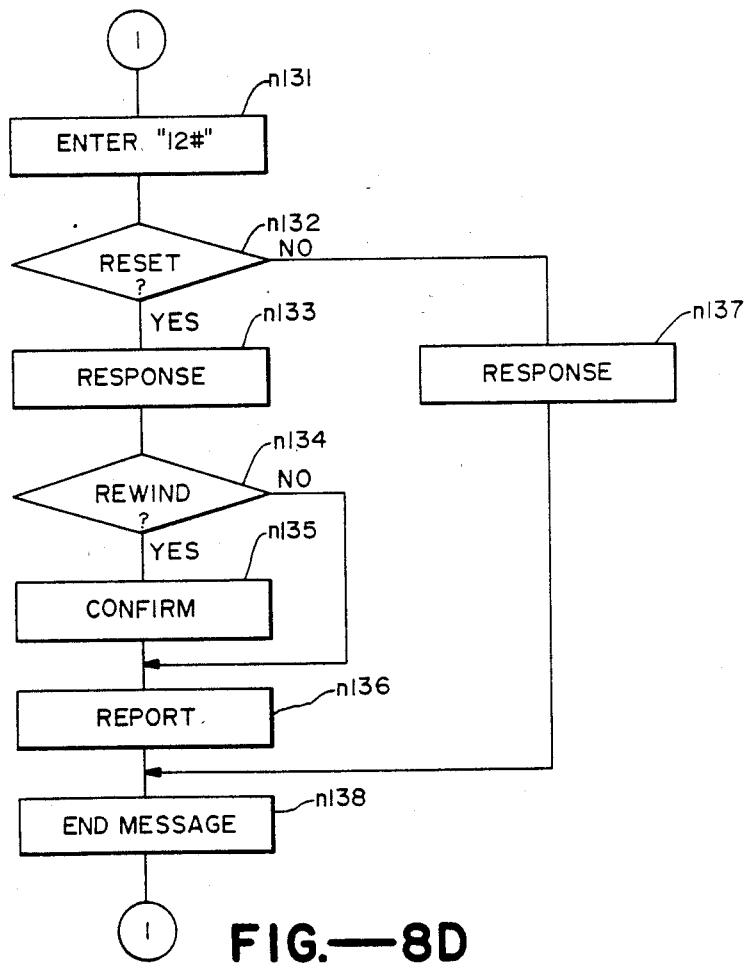
FIG.—8D

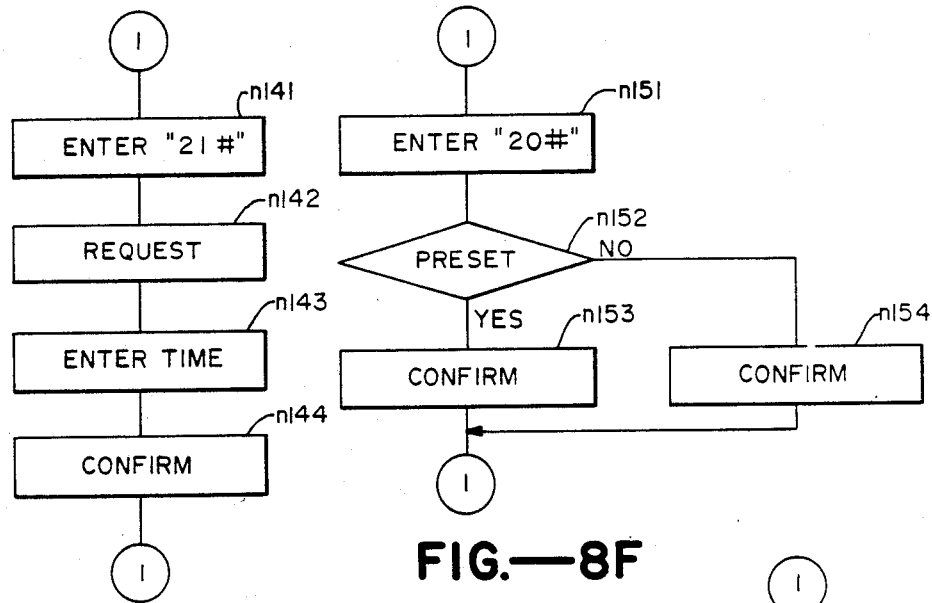
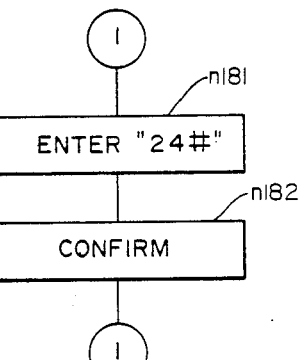
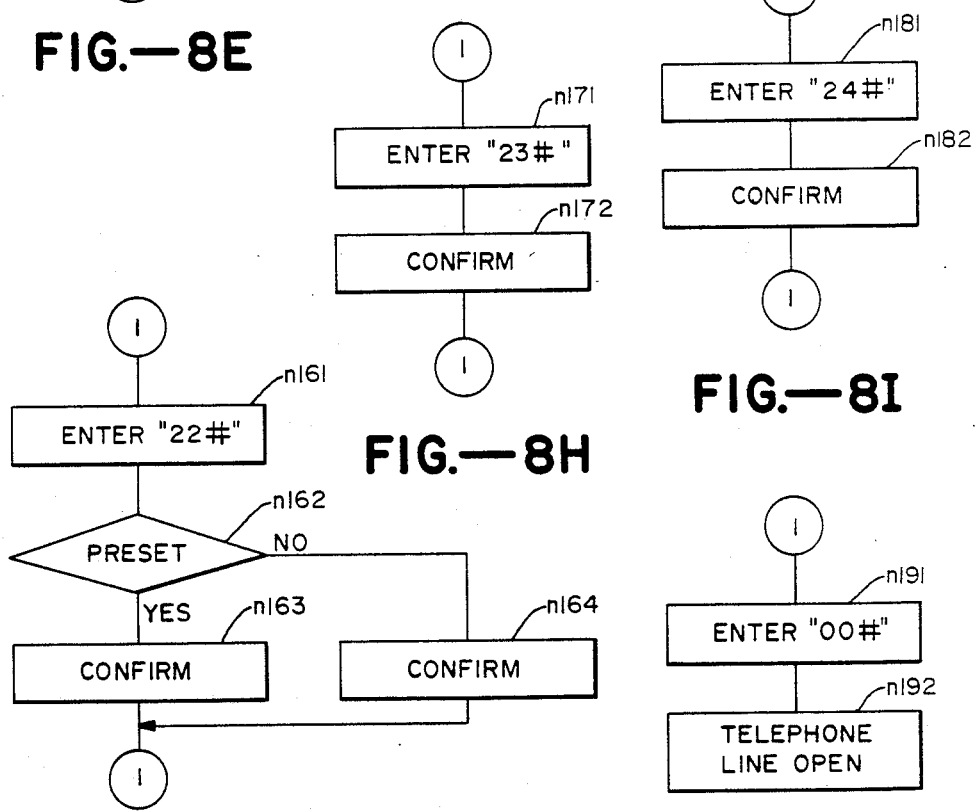
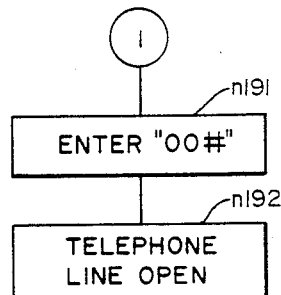
FIG.—8E
FIG.—8F
FIG.—8G
FIG.—8H
FIG.—8I
FIG.—8J

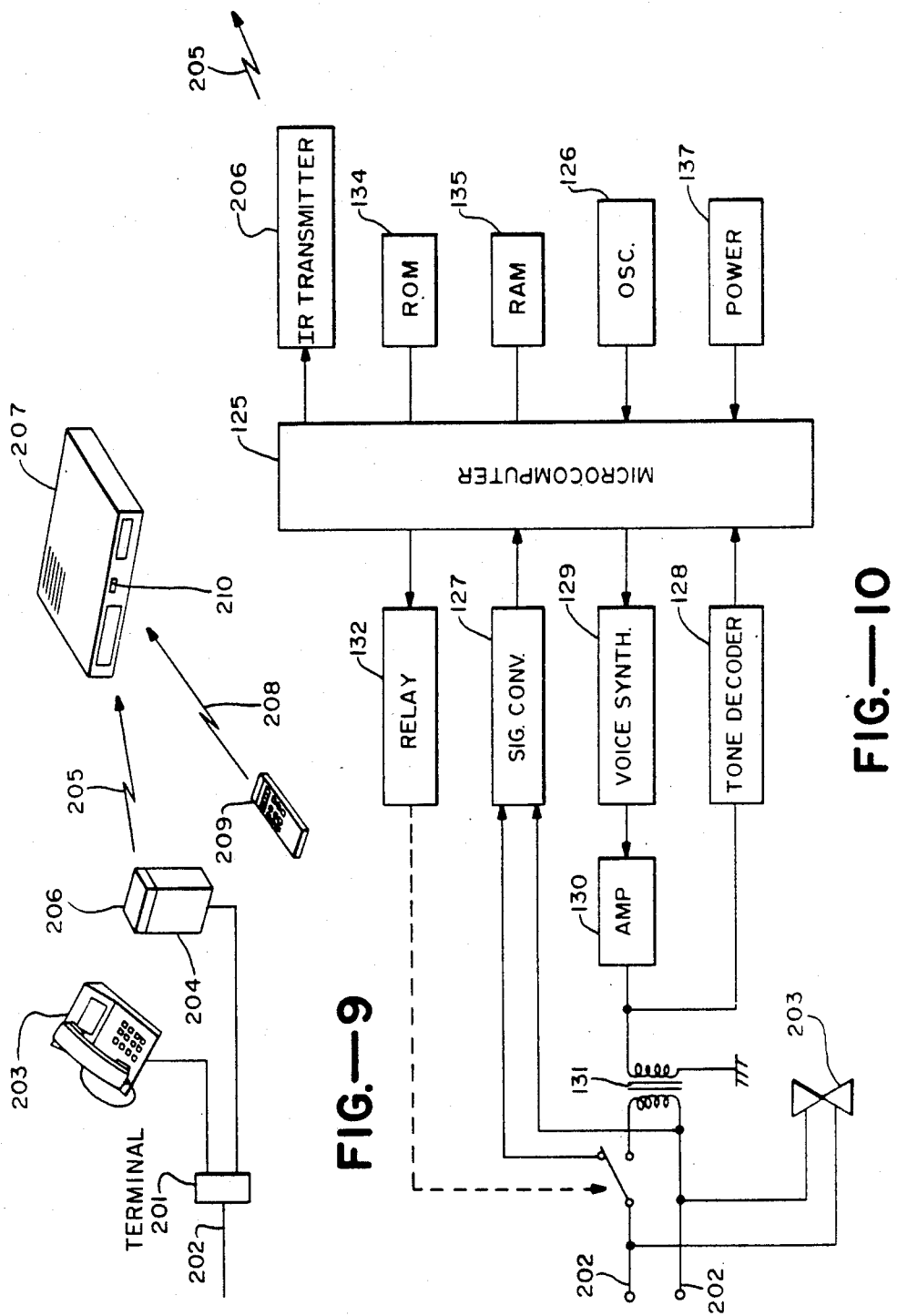

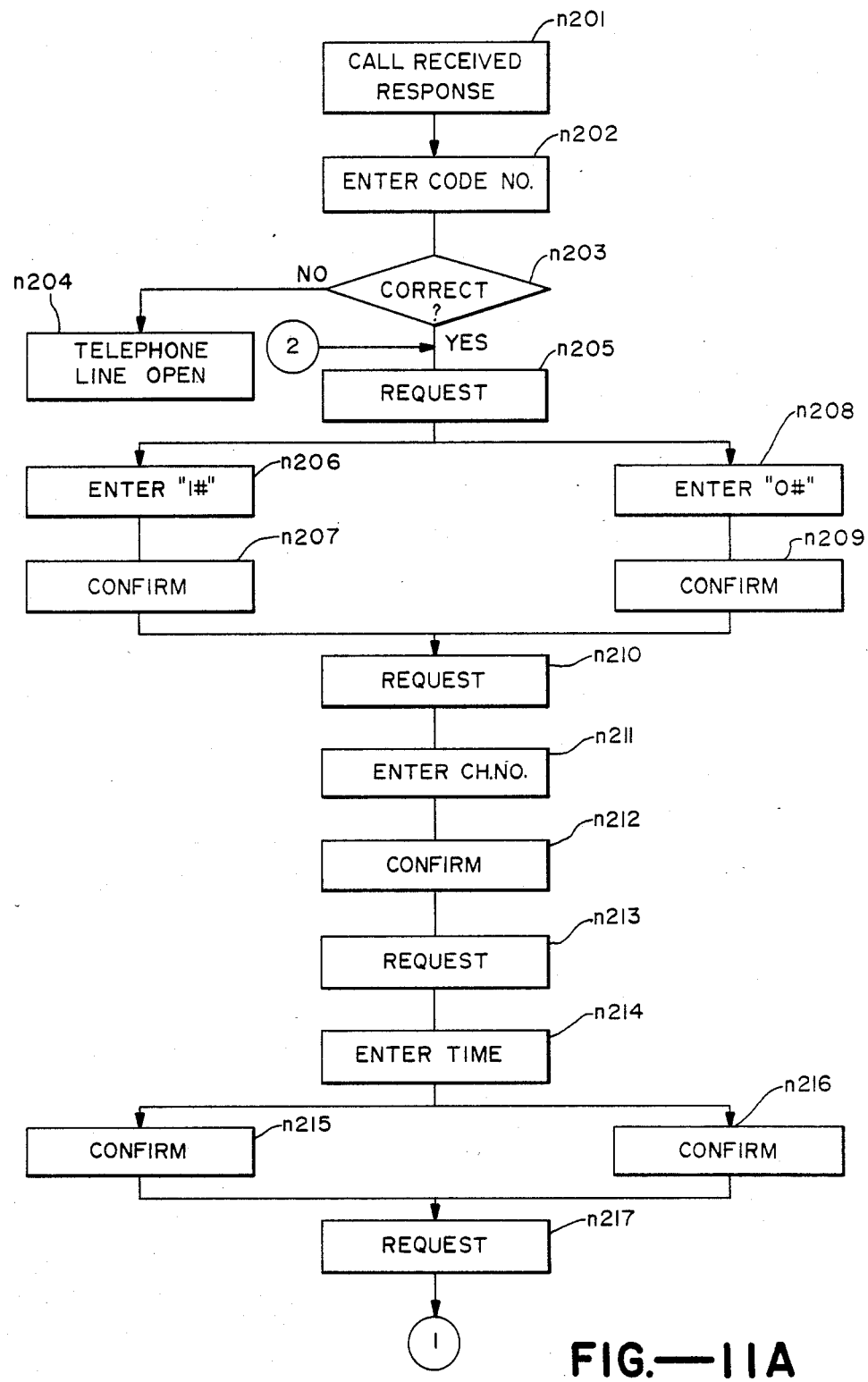
FIG.—11A

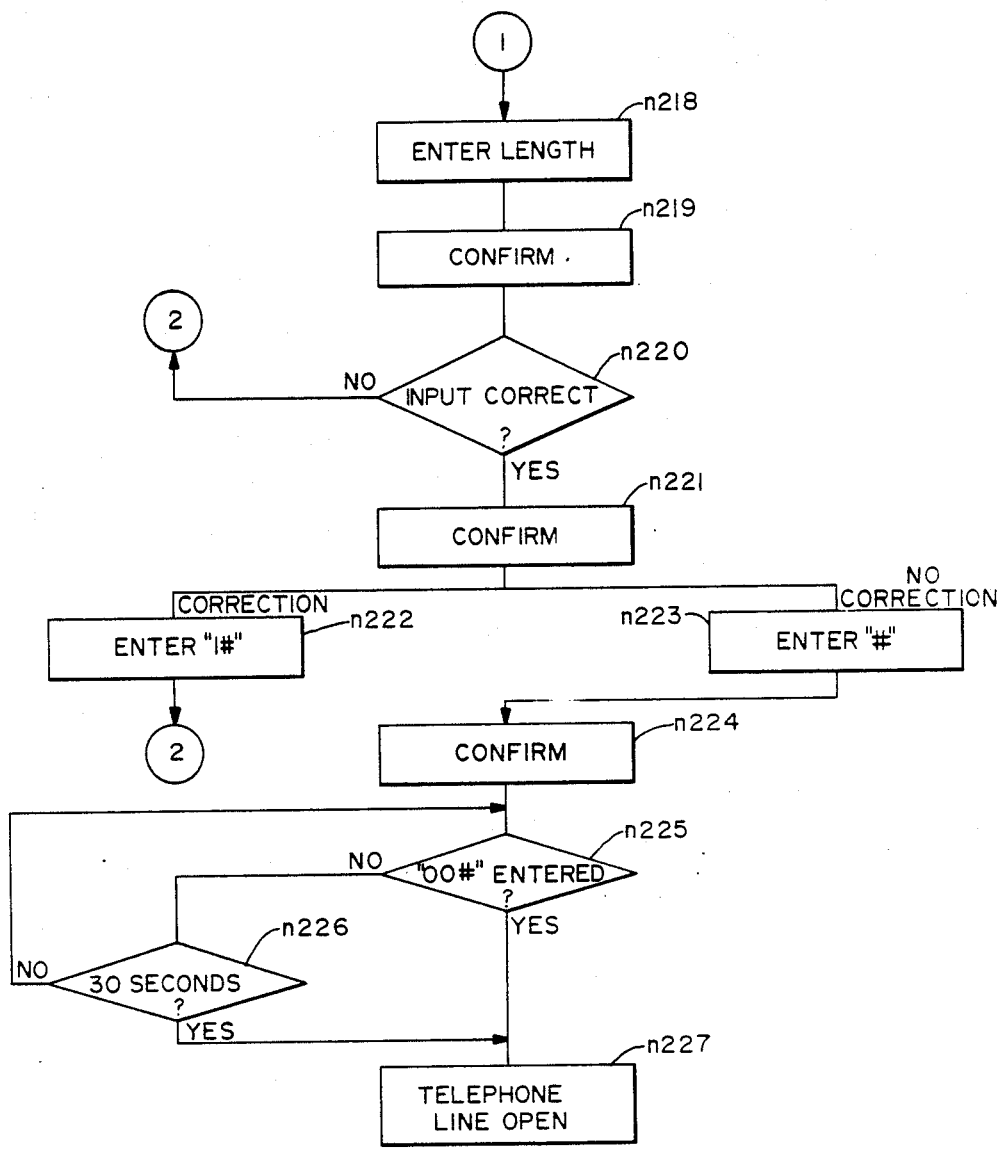
FIG.—11B

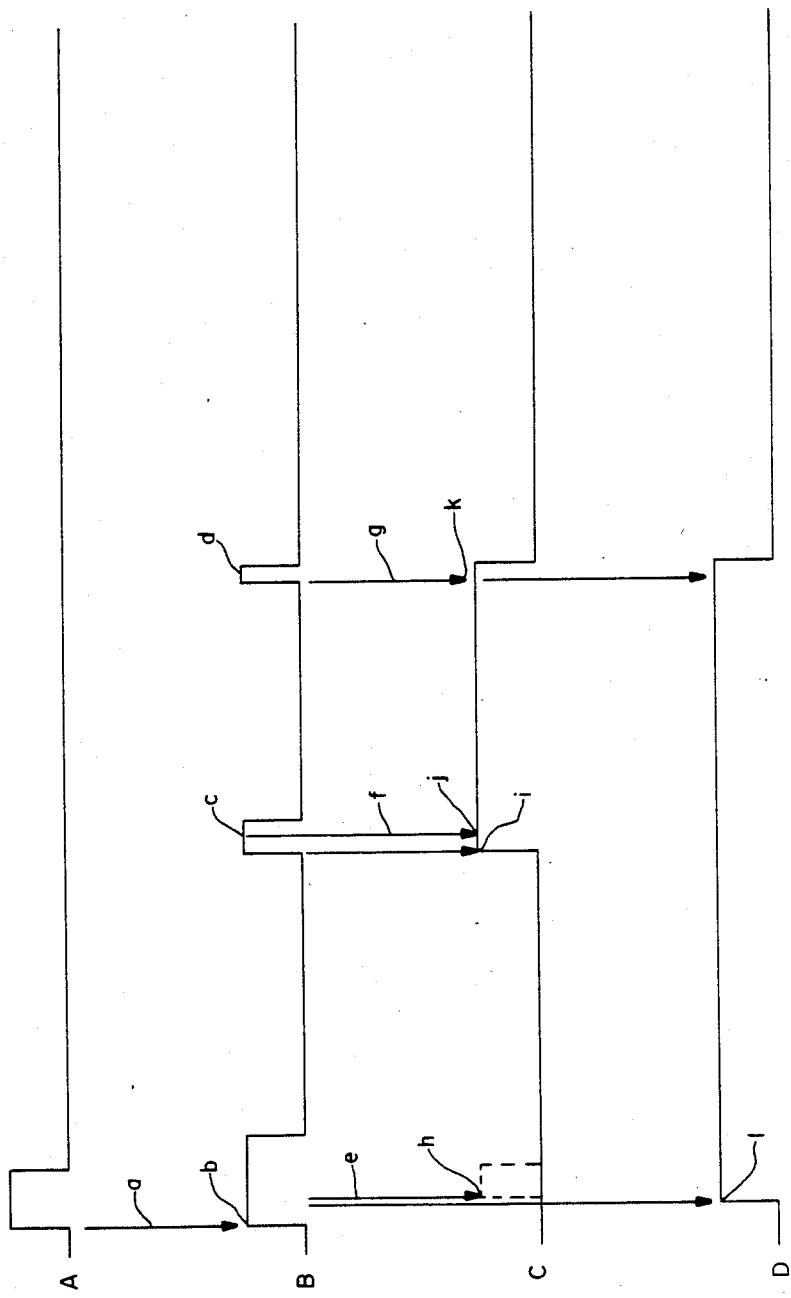
FIG.—12

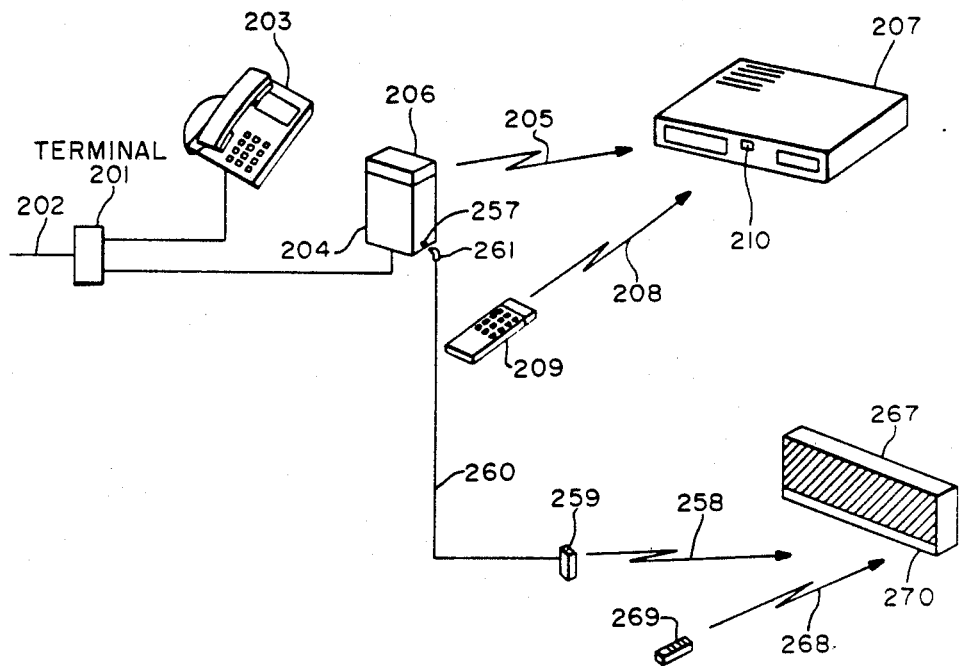
FIG.—13
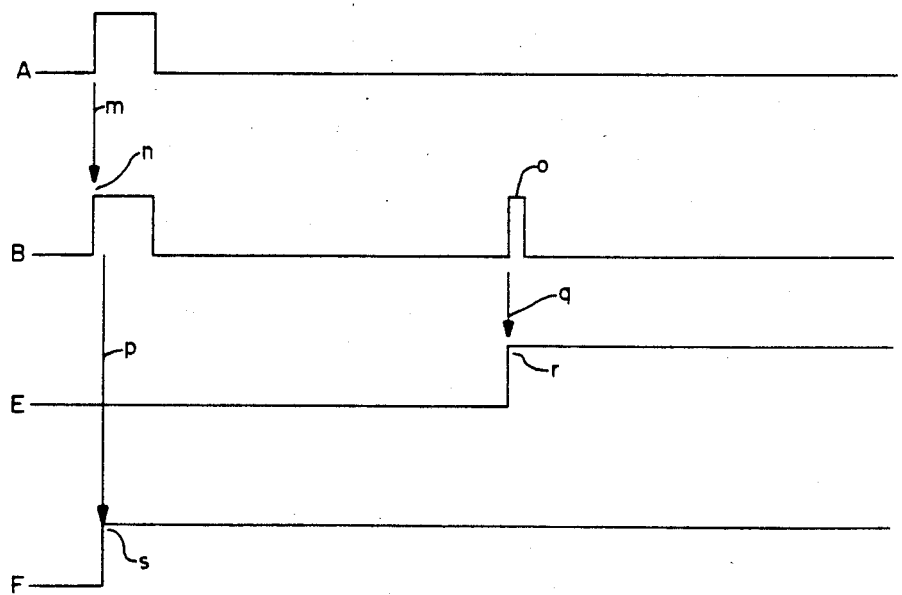
FIG.—16

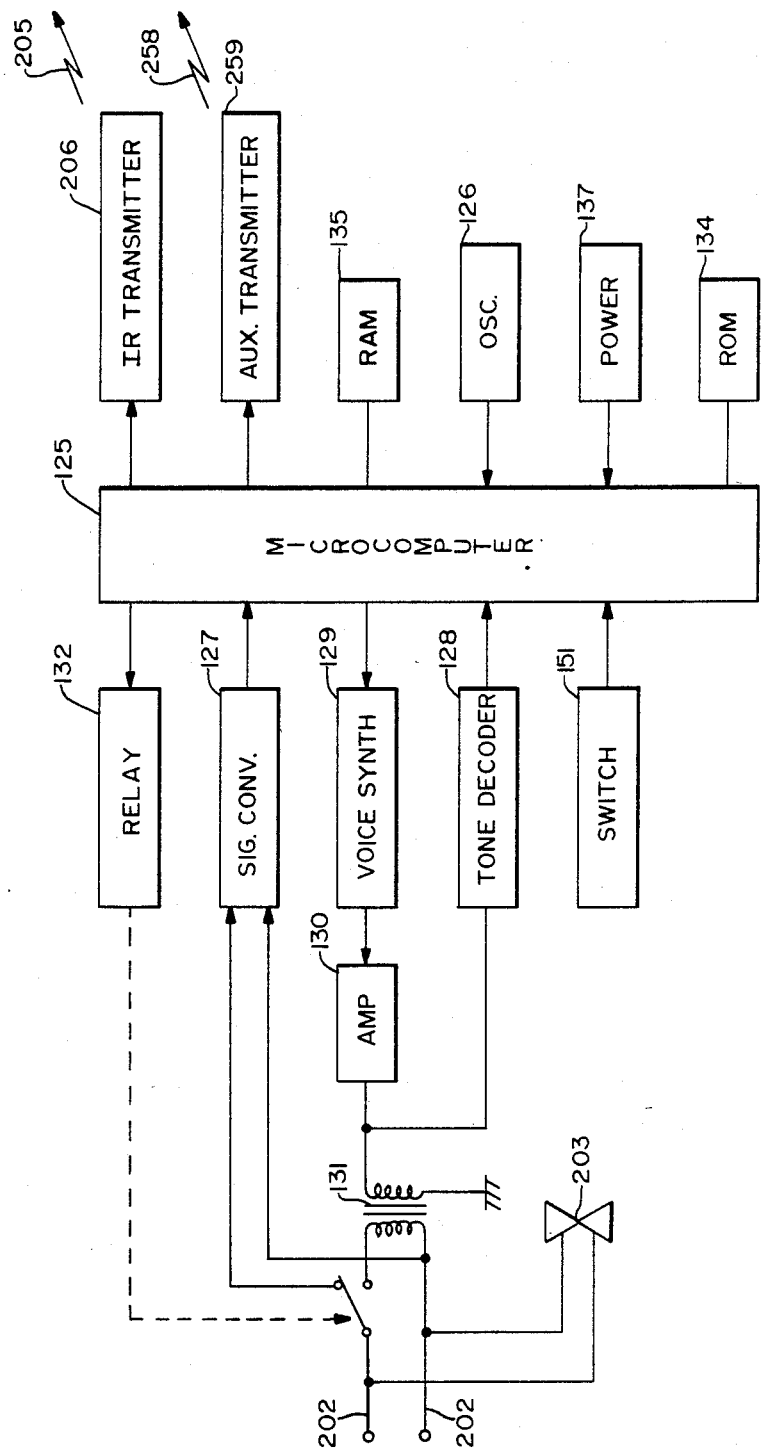
FIG.—14

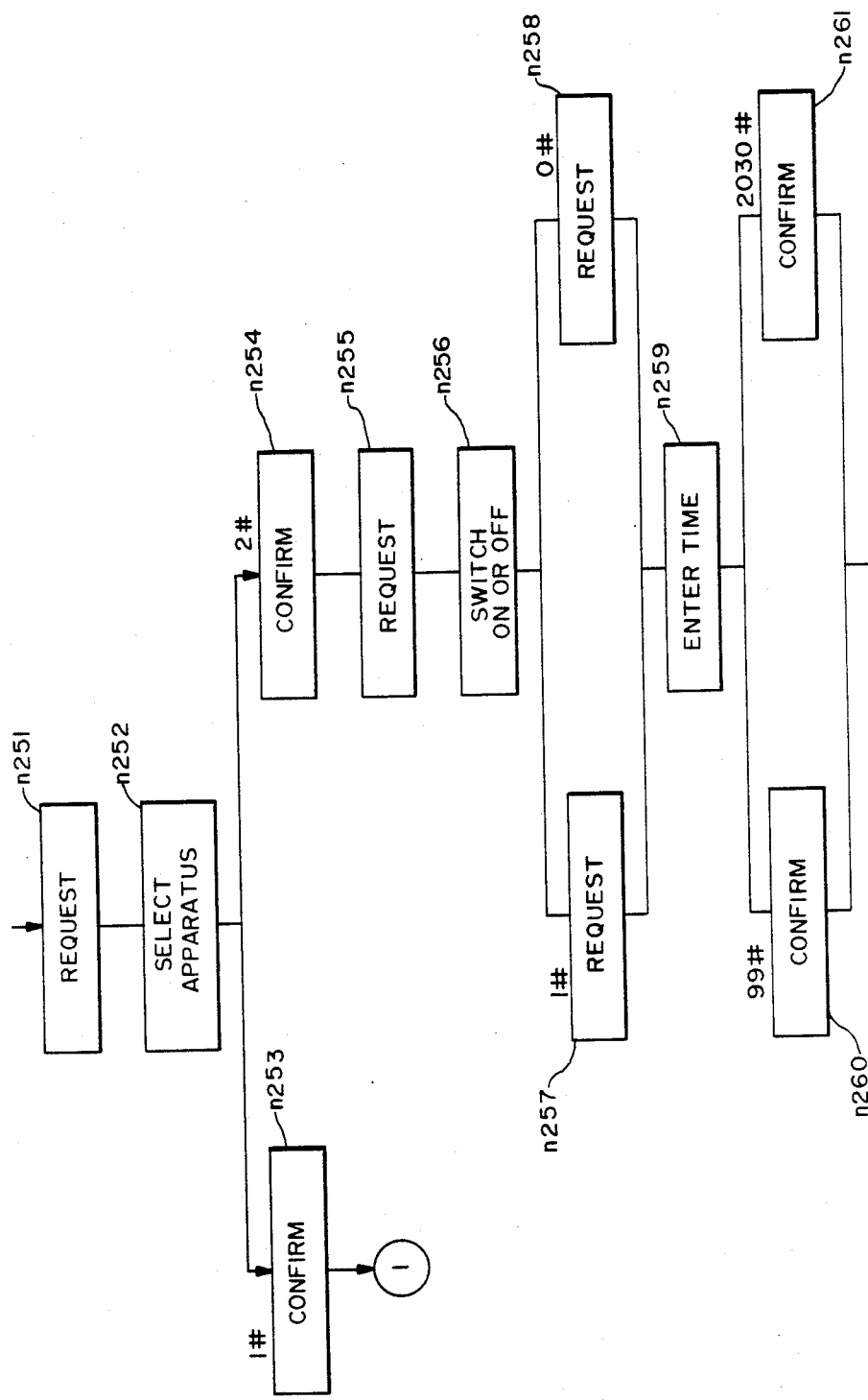
FIG.—15

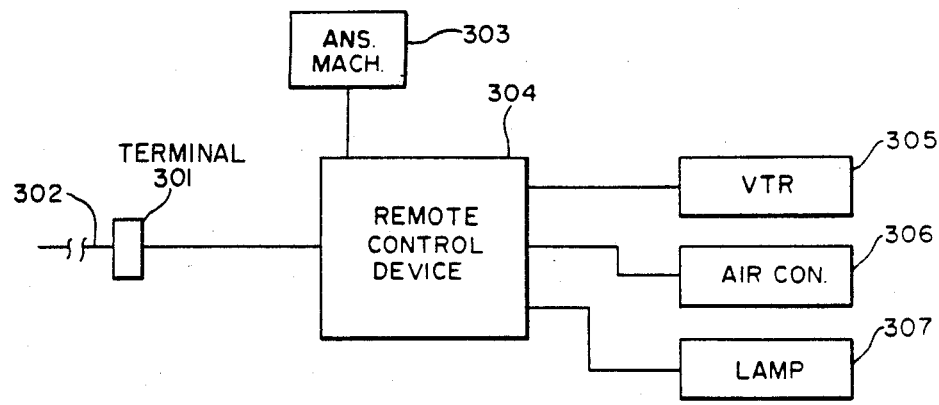
FIG.—17
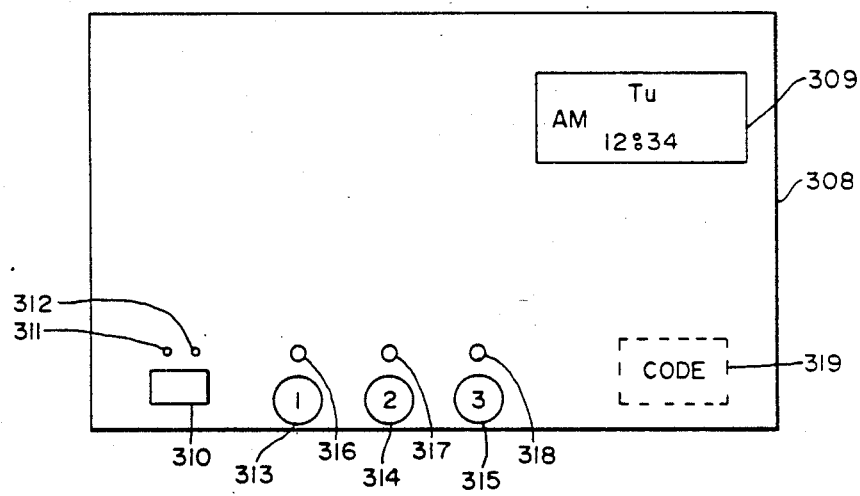
FIG.—18
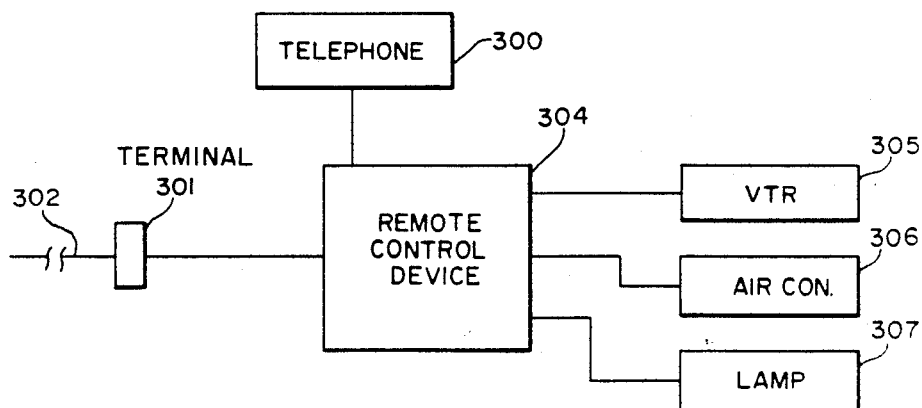
FIG.—21

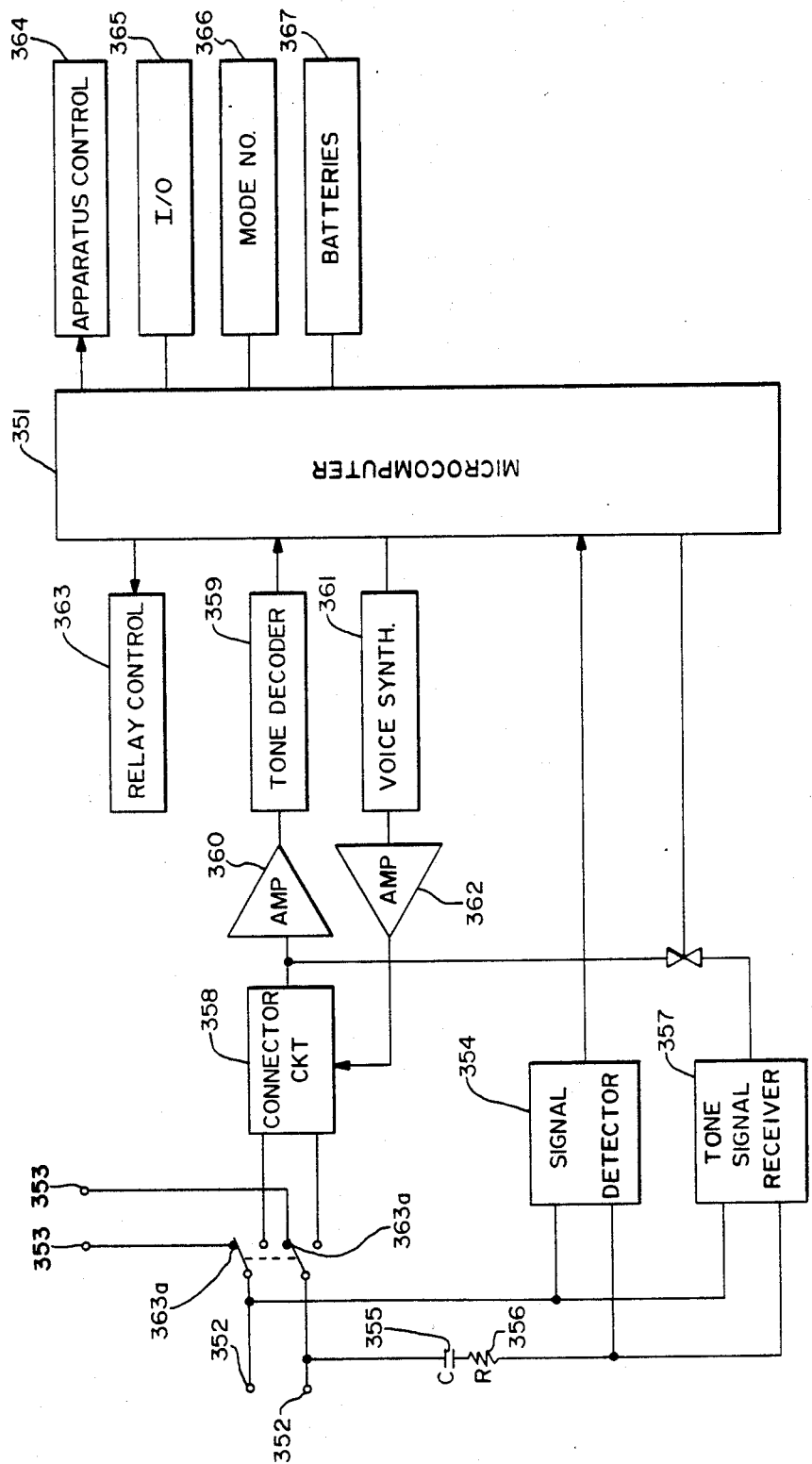
FIG.—19

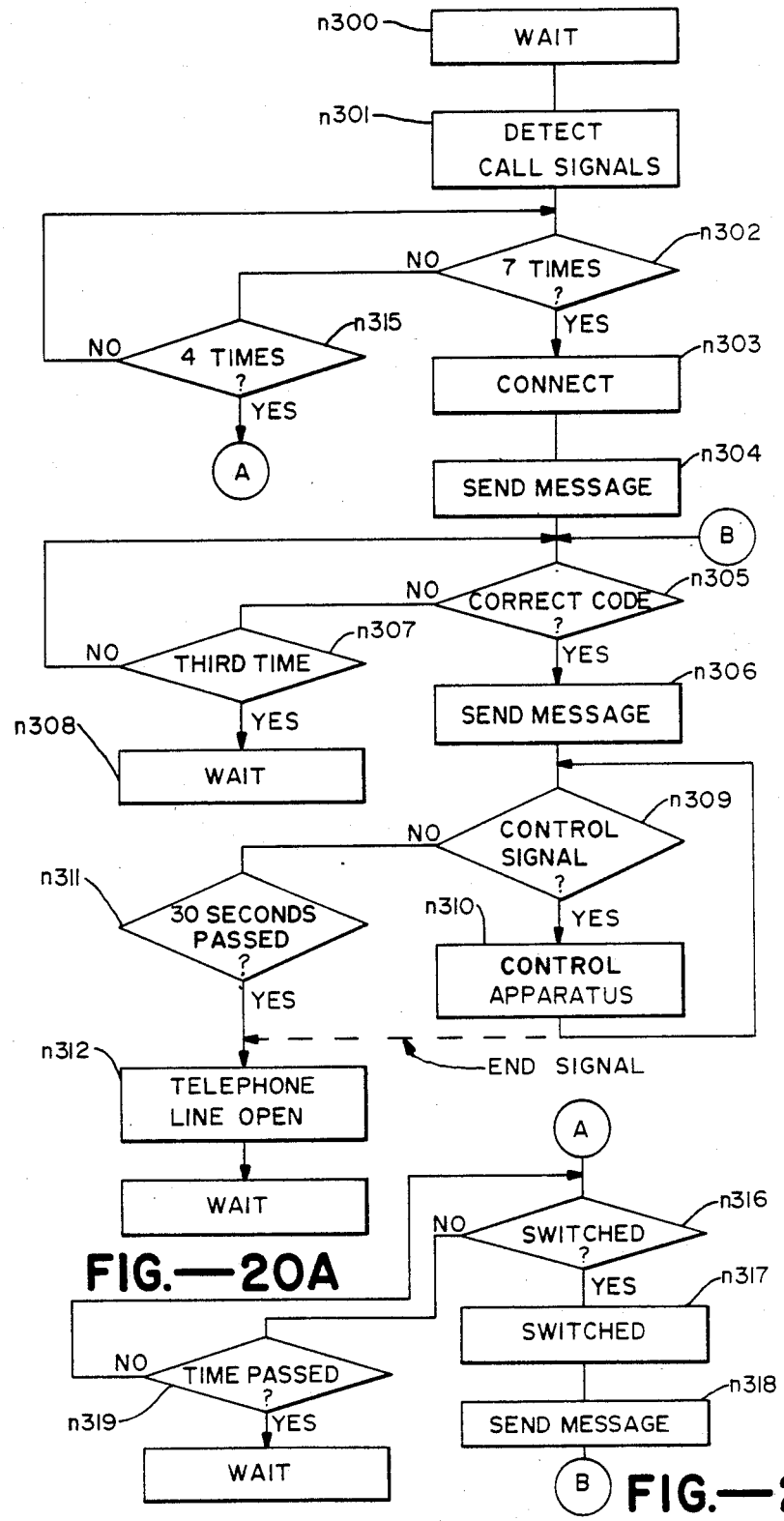
FIG.—20A
FIG.—20B

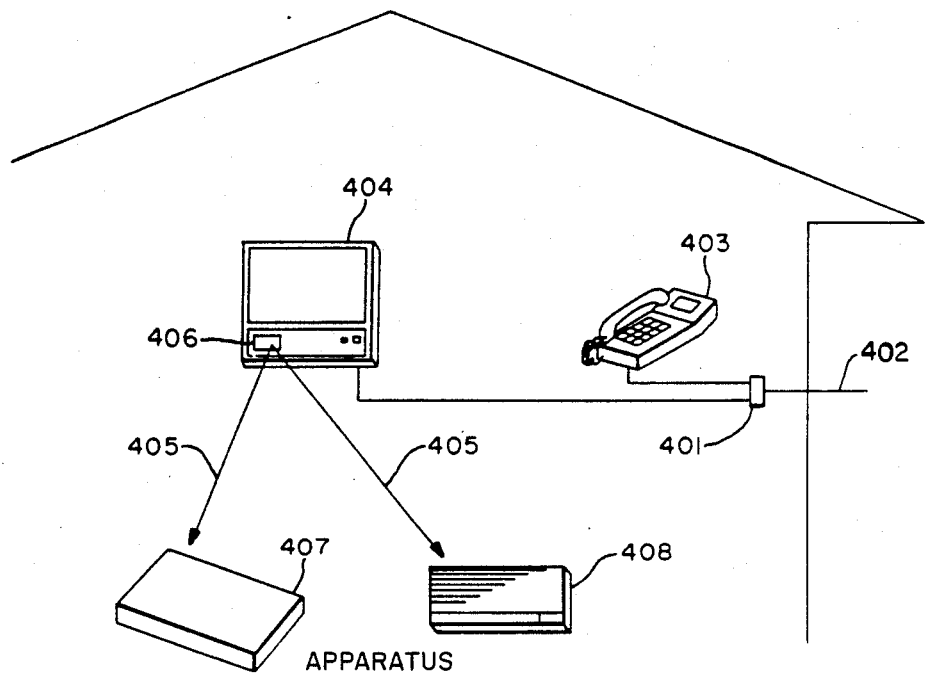
FIG.—22
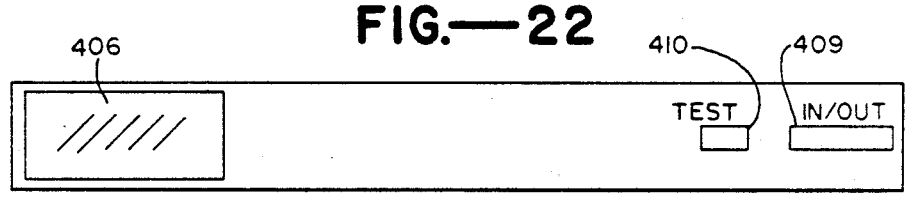
FIG.—23
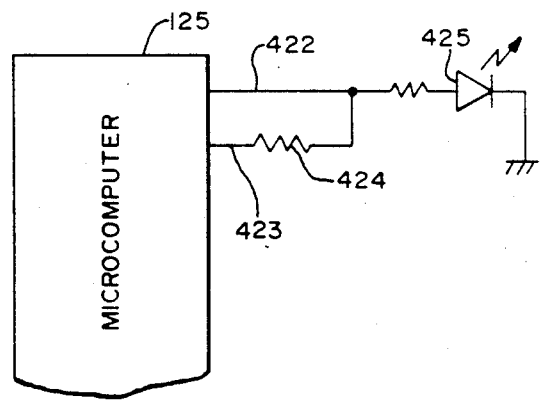
FIG.—24

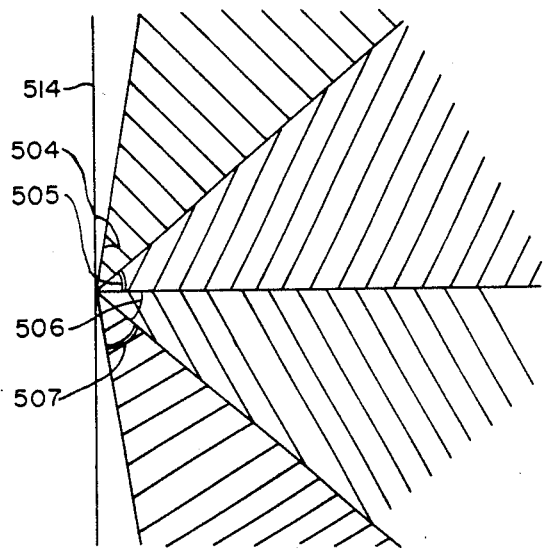
FIG.—32
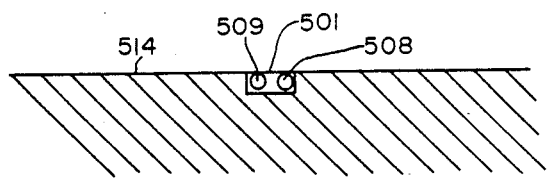
FIG.—33
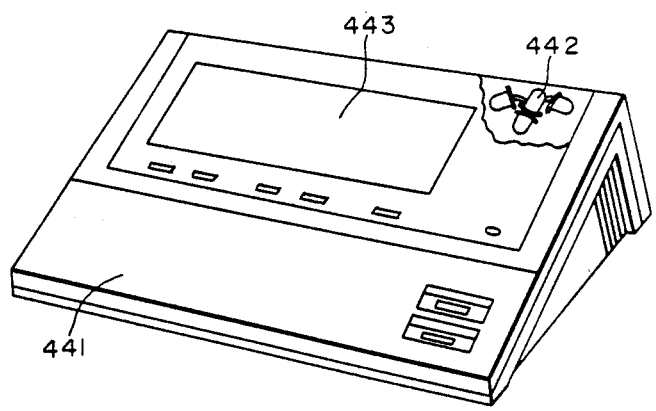
FIG.—25

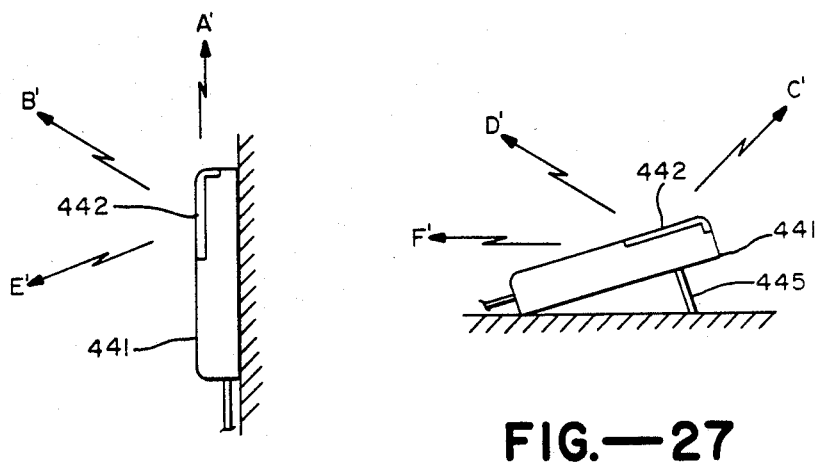
FIG.—26
FIG.—27
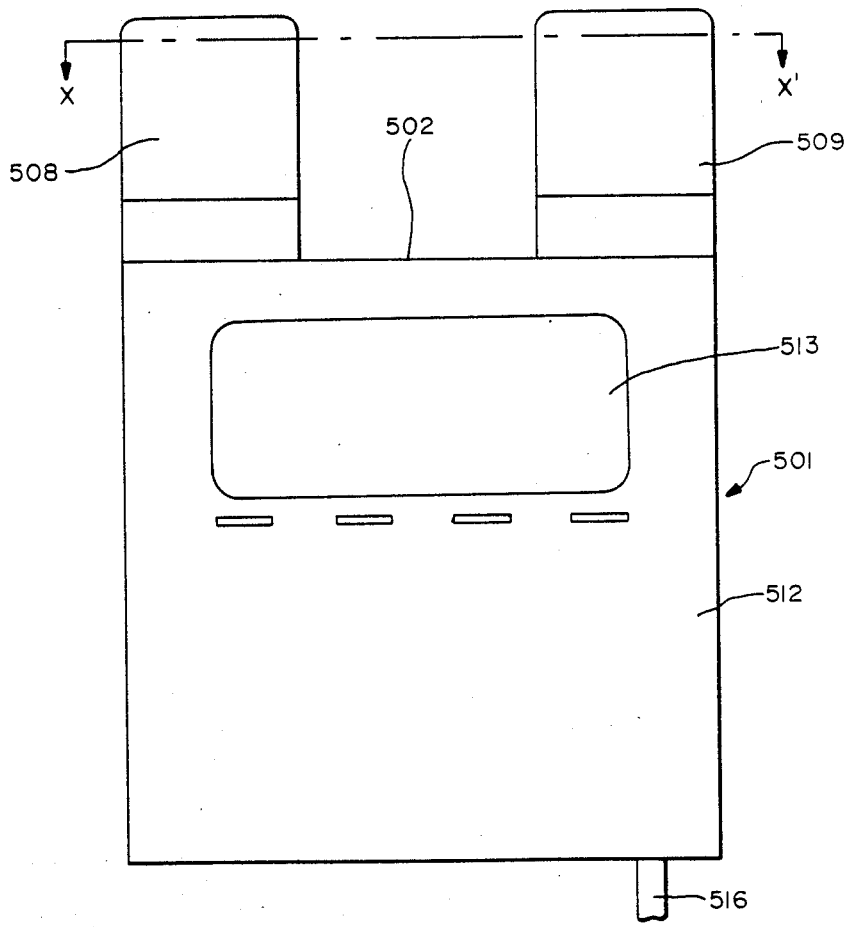
FIG.—28

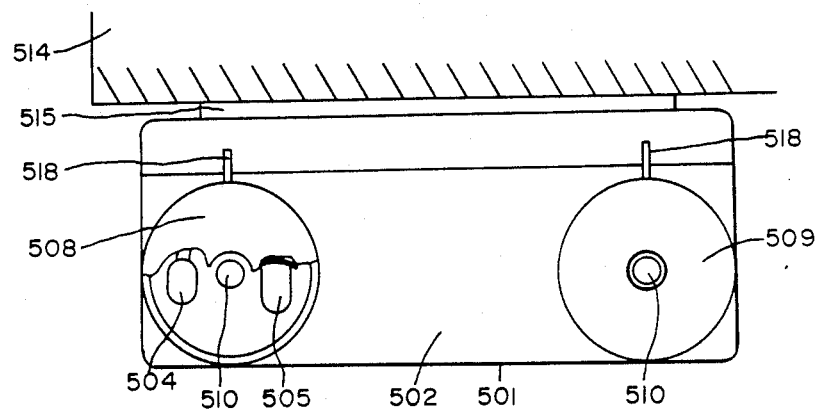
FIG.—29
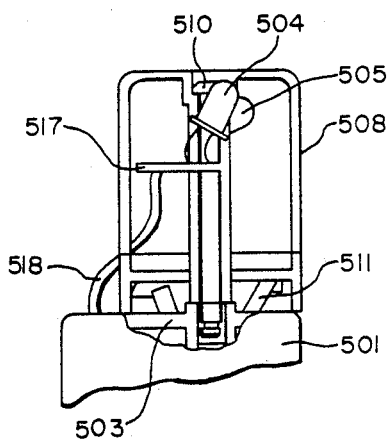
FIG.—30
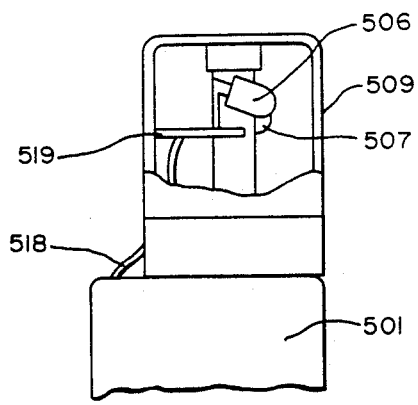
FIG.—31

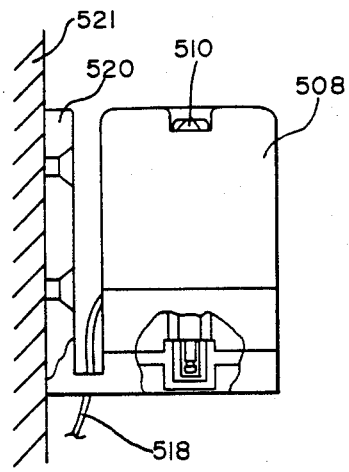
FIG.—34
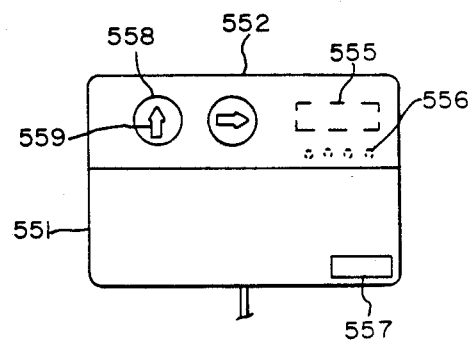
FIG.—35
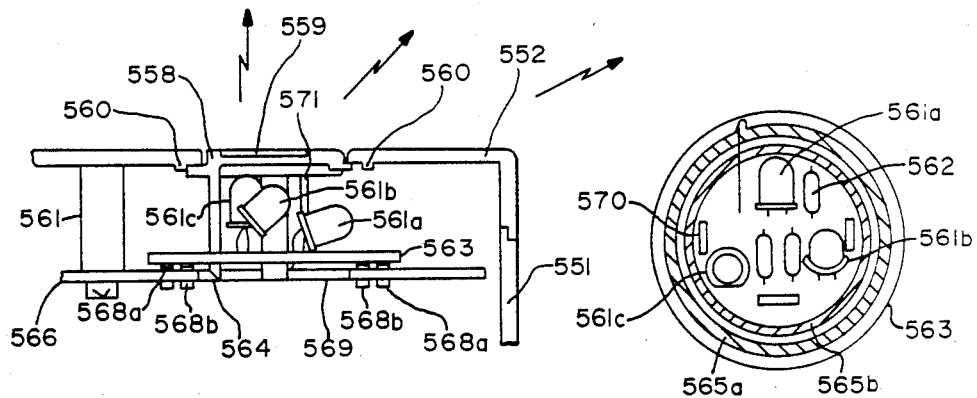
FIG.—36
FIG.—37
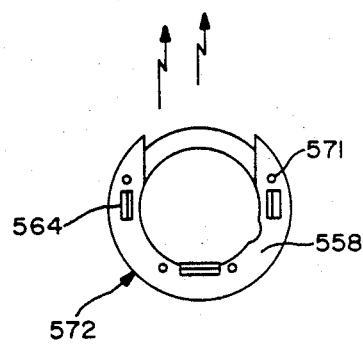
FIG.—38
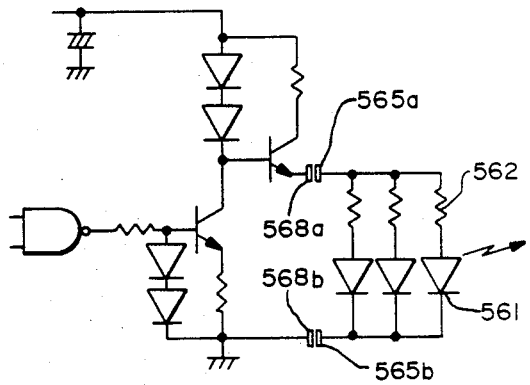
FIG.—39

REMOTE CONTROL DEVICE USING A TELEPHONE LINE

This is a continuation of application Ser. No. 170,117 filed Mar. 3, 1988 now abandoned, which is a continuation of application Ser. No. 008,840 filed Jan. 30, 1987 now abandoned.

BACKGROUND OF THE INVENTION

This invention relates to a remote control device such as a telecontrol system or a telecontroller by means of which various command signals can be transmitted from outside through a telephone line to control the operation of electrical devices in the house where the signals are received. In particular, the present invention relates to such a remote control device which automatically answers the caller if there is no person to take the call and controls the operation of electrical apparatus such as a video tape recorder or an air conditioner according to the caller's command.

Conventional remote control devices making use of a telephone line to transmit a caller's command signals are generally comprised of an automatic answering device which automatically responds to an incoming call and a controlling device which controls, according to the command signals which have been received, the operation of various apparatus in the house where the call is received. More in detail, the automatic answering device responds to an incoming call and transmits a prepared response message to the caller and the caller, upon receiving this response message, transmits a control signal defined for a particular mode of operation. The control signal is interpreted by the controlling device which controls the apparatus according to the signal thus interpreted. With a conventional remote control device of this type, the user must transmit a command exactly at the time when it is desired to control an apparatus in the house. In other words, the desired operation cannot be performed unless a telephone is accessible to the user at the crucial moment, or if the user forgets to make the call.

SUMMARY OF THE INVENTION

It is therefore a basic object of the present invention in view of the aforementioned disadvantage to provide a remote control device making use of a telephone line with which the user is not required to send a command every time it is desired to operate an apparatus.

The above object of the present invention is achieved by providing an improved remote control device which comprises memory means for storing time data for the operation of various apparatus including the times at which these apparatus are to be switched on and off and control means for executing the operation of these apparatus according to the time schedule stored in the memory means. Such a remote control device, however, can be realized with various additional features.

It is therefore another object of the present invention to provide a remote control device with the aforementioned capabilities which controls the apparatus by cordless means, for example by transmitting infrared light or supersonic wave control signals.

It is still another object of the present invention to provide such a remote control device that controls an apparatus having its own cordless remote controller.

It is still another object of the present invention to provide a remote control device having a primary transmitter assembly for transmitting signals to control apparatus and a connector for additionally connecting an auxiliary transmitter assembly which is equivalent to the primary transmitter assembly and can be placed nearer to a selected apparatus to be controlled.

It is still another object of the present invention to provide a remote control device which can perform its intended remote control functions even if a telephone or an automatic responding device such as an answering machine on the same telephone line receives the user's call from outside.

It is still another object of the present invention to provide a remote control device with which it can be tested easily whether its intended functions are properly being performed.

It is still another object of the present invention to provide a remote control device which functions efficiently with a relatively small number of infrared light emitting diodes.

It is still another object of the present invention to provide a remote control device with transmitter assemblies which are removable from the housing of the device.

It is still another object of the present invention to provid a remote control device with transmitter assemblies which are adjustably rotatable so that infrared light emitted therefrom can be aimed accurately to apparatus to be controlled.

These additional and other objects are achieved by providing one of the remote control devices to be described below or a device easily obtainable by combining features of some of them.

BRIEF DESCRIPTION OF THE DRAWINGS

The accompany drawings, which are incorporated in and form a part of the specification, illustrate embodiments of the present invention and, together with the description, serve to explain the principles of the invention. In the drawings:

FIG. 1 is a conceptual drawing showing the structure of a remote control device embodying the present invention, FIG. 2 is a block diagram of the control system of the remote control device of FIG. 1, FIG. 3 (consisting of FIGS. 3A and 3B is a flow chart of the operation of the control system of FIG. 2, FIG. 4 is a conceptual drawing showing the structure of another remote control device embodying the present invention, FIG. 5 is a block diagram of the control system of the remote control device of FIG. 4, FIG. 6 is a block diagram showing the circuit structure of the adapter shown in FIG. 4, FIG. 7 is a front view of the display section of the control device of FIG. 4, FIGS. 8A–8J are a flow chart of the operation of the control system of FIG. 5, FIG. 9 is a conceptual drawing showing the structure of another remote control device embodying the present invention, FIG. 10 is a block diagram of the control system of the remote control device of FIG. 9, FIG. 11 (consisting of FIGS. 11A and 11B) is a flow chart of the operation of the control system of FIG. 10 for the remote control device of FIG. 9, FIG. 12 is a time chart of the operation depicted in FIG. 11, FIG. 13 is a conceptual drawing showing the structure of another remote control device embodying the present invention, FIG. 14 is a block diagram of the control system of the remote control device of FIG. 13, FIG. 15 is a portion of a flow chart of the operation of the control system of FIG. 13 when an air conditioner is controlled, FIG. 16 is a time chart of the operation depicted in FIG. 15 when the user elects to operate the air conditioner, FIG. 17 is a block diagram showing the connections of still another remote control device embodying the present invention, FIG. 18 is a plan view of the control panel of the control device of FIG. 17, FIG. 19 is a block diagram of the control system of the remote control device of FIG. 17, FIG. 20 (consisting of FIGS. 20A and 20B) is a flow chart of the operation of the control system of FIG. 19, FIG. 21 is a block diagram showing the connection of still another remote control device embodying the present invention, FIG. 22 is a conceptual drawing showing the connection of another remote control device embodying the present invention, FIG. 23 is a schematic front view of a part of the control device shown in FIG. 22, FIG. 24 is a schematic circuit diagram of the infrared transmitter shown in FIGS. 22 and 23, FIG. 25 is a perspective view of a control device embodying the present invention, FIG. 26 is a drawing schematically showing the directions in which various control signals will have to be transmitted from a control device attached on a wall, FIG. 27 is a drawing schematically showing the directions in which various control signals will have to be transmitted from a control device placed on a horizontal surface, FIG. 28 is a front view of a control device of the present invention, FIG. 29 is a sectional plan view of a part of the control device of FIG. 28 taken along the line X—X', FIG. 30 is a schematic sectional view of the first transmitter assembly of the control device of FIGS. 28 and 29, FIG. 31 is a schematic sectional view of the second transmitter assembly of the control device of FIGS. 28 and 29, FIG. 32 is a schematic drawing showing the vertical angular ranges in which light is emitted from the four light emitting diodes shown in FIGS. 30 and 31, FIG. 33 is a schematic drawing showing the horizontal angular range in which light is emitted from the four light emitting diodes shown in FIGS. 30 and 31, FIG. 34 is a schematic horizontal view of a transmitter assembly shown in FIGS. 28 and 30 when it is removed from the housing and attached to a wall, FIG. 35 is a front view of another control device of the present invention, FIG. 36 is a schematic sectional view of a part of the interior of the control device of FIG. 35, FIG. 37 is a plan view of the printed circuit board shown in FIG. 36, FIG. 38 is a rear view of a knob shown in FIG. 35, and FIG. 39 is a circuit diagram showing the connection of the light emitting diodes in the control device of FIG. 35.

DETAILED DESCRIPTION OF THE INVENTION

A remote control device embodying the present invention is described below by way of FIG. 1 which shows its structure conceptually, FIG. 2 which is a block diagram of its control system and FIG. 3 which is a flow chart of its operation. With reference first to FIG. 1, numeral 1 indicates a control device of the present invention equipped with an IN button 2 for selecting a mode of operation intended when there is somebody at home (hereinafter referred to as the IN mode), an OUT button 3 for selecting another mode of operation intended when there is nobody at home to receive a call (hereinafter referred to as the OUT mode), apparatus controlling switches. 4, 5 and 6 respectively for switching terminal apparatus 12, 13 and 14 on and off, display lamps 7, 8 and 9 for showing respectively whether the terminal apparatus 12, 13 and 14 are switched on or off, a dip switch 10 for setting a code number and a clock 11 for showing the time. The control device 1 is connected not only to the terminal apparatus 12, 13 and 14 through its relay junction points but also to a telephone 15 through a terminal 16 which is connected to a telephone line 17.

With reference next to FIG. 2, the control system of the aforementioned control device 1 includes a microcomputer 18 which controls signals as a whole, an oscillator (OSC) 19 which generates standard clock signals for the microcomputer 18, a signal converter (SIG. CONV.) 20 for transmitting incoming call signals to the microcomputer 18 (by converting them, if necessary, into a form compatible to the specification of the microcomputer 18), a tone decoder 21 which decodes multifrequency signals sent from a caller's telephone through the line 17 and transmits them to the microcomputer 18, a voice synthesizer (VOICE SYNTH.) 22 for producing vocal sound, an amplifier (AMP) 23 for amplifying sound from the voice synthesizer 22, an interface 24 for connecting the multifrequency signals and voice signals to the telephone line 17, a relay 25 for closing a DC circuit by switching from the signal converter 20 to an internal circuit, a driver 27 which transmits signals for controlling a lamp 26 and terminal apparatus 12, 13 and 14, a mode selecting switch (MODE SW.) 28 for selecting between the IN and OUT modes of operation referred to above, a clock circuit (CLOCK CKT) 29 for displaying and setting the time, ROM 30 for storing programs such as procedures for controlling different operations and responses to a call, RAM 31 for storing the caller's command signals, a code setting section (CODE SET) 32 for setting a code number, and a power source (POWER) 33 such as batteries.

Operation of the control device 1 described above is explained next by way of an example wherein the user controls the operation of the terminal apparatus indicated by the numeral 12. Prior to leaving the house, the user first switches on the desired apparatus 12. If the display lamp 7 corresponding to this apparatus 12 has been on, power is supplied to it and the apparatus 12 starts to operate immediately. If this happens, the user presses the apparatus controlling switch 4 related to this apparatus and turns off the display lamp 7 for this apparatus, thereby stopping the supply of power thereto. The user then presses the OUT button 3 to select the OUT mode of operation (n1 of FIG. 3) and leaves the house.

When somebody calls in thereafter from outside (YES in n2) and the telephone 15 rings, call signals are taken in by the microcomputer 18 through the signal converter 20. After a predetermined number of call signals are counted, the control device 1 interprets it as a call and closes the aforementioned DC circuit by activating the relay 25. This causes a message to be transmitted to the caller through the voice synthesizer 22, the amplifier 23 and the interface 24, and the caller is informed that there is nobody at home to take the call (n3). The system is now ready for remote control operation. If the call was from somebody not intending to operate any apparatus in the house, such a caller will hang up upon learning that there is nobody in the house to speak to. If it is the user who made the call, the user proceeds to form an assigned code number on the numeric buttons and the "#" button is pressed at the end (in the case of a push-button phone as shown in FIG. 1). The number thus entered is decoded by the tone decoder 21 and transmitted to the microcomputer 18 which determines whether a correct code number has been received. If it is identified as the correct number (YES in n4), a message is transmitted to the user, requesting an input (n5). All messages given to the caller are preferably preceded by a tone signal (such as "ding-dong") to alert the listening caller that a verbal message is about to follow, but neither this nor the sound of the tone signaliis intended to limit the scope of this invention.

Thereafter, the user enters a command by way of an operation code according to a code table, an example of which is shown in Table 1 wherein the three terminal apparatus 12, 13 and 14 of FIG. 1 are identified by Apparatus Nos. 1, 2 and 3, respectively.

TABLE 1

| Apparatus No. | Control Code | Operation |
|---|---|---|
| 1 | 0 | Switch off Apparatus No. 1 |
|   | 1 | Switch on Apparatus No. 1 |
|   | 2 | Set Apparatus No. 1 in MONITOR MODE |
| 2 | 0 | Switch off Apparatus No. 2 |
|   | 1 | Switch on Apparatus No. 2 |
|   | 2 | Set Apparatus No. 2 in MONITOR MODE |
| 3 | 0 | Switch off Apparatus No. 3 |
|   | 1 | Switch on Apparatus No. 3 |
|   | 2 | Set Apparatus No. 3 in MONITOR MODE |

(Operation Code spans Apparatus No. and Control Code columns)

The user, wishing to operate Apparatus No. 1, enters the operation code "11#" according to Table 1 (n6). The system thereupon returns a message, requesting the input of the starting time (n7). If the user enters "1915#", for example, to indicate that Apparatus No. 1 should be set to go on at 7:15 p.m. (n8), the system responds by verbally reciting the set time for confirmation (n9). If an error is found (NO in n10), the user can cause the system to go back to Step n7. Otherwise, the system requests to know how long the selected apparatus should be kept in the switched-on condition (n11). If the user enters "0300#", for example, to indicate "3 hours" (n12), the system again recites the input for confirmation (n13) as done in Step n9. If there is no error (YES in n14), the user is still allowed to cancel the setting (NO in n15) and go back to Step n5 but if the user is satisfied with the setting as confirmed, a code (such as "00#") to this effect is entered likewise through the use of the numeric buttons (YES in n15). Thereafter, the control device 1 is disconnected from the telephone line 17 (n16) and when the time set in Step n8 is reached (YES in n17), the designated apparatus is switched on (n18), and so forth.

The present invention has been described above by way of a particular embodiment but the scope of the present invention is not intended to be limited thereby. The number of terminal apparatus to be controlled is not limited to be three and the operation codes may be designed in any manner desired. The control system may be further so designed that the telephone line is automatically opened if an incorrect code number is received or a predetermined length of time passes without any input of a code number by the caller.

The basic objects of the present invention are achieved by a device of the type described above by way of FIGS. 1, 2 and 3, but it goes without saying that this device can be improved in many aspects. One of the drawbacks of the device described above is that the terminal apparatus to be controlled are connected to the control device 1 by cables. The cost of installation is therefore not negligible and cables connected to the individual apparatus can be quite unsightly. If the so-called power line transmission method is used, apparatus for such transmission are equally costly and there will additionally be required block filters for preventing signal leaks, bypass capacitors for preventing signal transmission failures caused by phase differences in the connection of a single-phase three-wire system, noise filters for eliminating noise from other electrical appliances in the house, etc. A remote control device according to another embodiment of the present invention, which can be installed inexpensively without crowding the house with unsightly cables and the like and does not require block filters, bypass capacitors, noise filters or the like, is disclosed next with reference to FIGS. 4 through 8. It is characterized as controlling target appliances by a cordless means such as supersonic waves, infrared light and the like.

As shown in FIG. 4, which is a conceptual drawing showing the structure of a remote control device of the present invention characterized above, a control device 101 is intended to control the operation of a video tape recorder 103, an adapter 105 for a lamp 104 and an air conditioner 106 and includes a mode selecting button 102 for selecting whether the device is operated in the IN or OUT mode defined above, a preset button 107 for selecting one or more of the aforementioned apparatus in the house to be operated or setting times of their operations, a clock button 108 for setting a clock, a cancel button 109 for cancelling a preset time, a code setting button 110 for setting a code number, a up-down button 111 (or ±button) for increasing and decreasing displayed number when setting the time, etc., a set button 112 for making an input as will be explained by way of an example below, a display section 113 for displaying information, and a transmitter 115 for transmitting control signals in the form of radiation such as infrared light 114. The adapter 105 serves to receive infrared light 114 transmitted by the control device 101 and to controllably switch on and off an apparatus connected thereto such as the lamp 104, and includes a light-receiving section 116, a power plug 117 and a power outlet 118 for connecting an apparatus to be controlled. The video tape recorder 103 and the air conditioner 106 are adapted to be controlled by infrared light signals. If conventional apparatus adapted for such control are used, there is no special trouble of installing light-receiving elements on them. Like the device shown in FIG. 1, this control device 101 is also connected in parallel with a telephone 121 to a telephone line 119 via a terminal 120.

The control system of the control device 1 is explained next by way of FIG. 5 wherein numerals 125 through 132 indicate respectively a microcomputer, an oscillator, a signal converter, a tone decoder, a voice synthesizer, an amplifier, an interface and a relay as explained in connection with FIG. 2. Likewise, numerals 134 and 135 indicate ROM storing programs and RAM for storing the caller's commands, respectively. FIG. 5 also shows a display circuit 133 which connects the aforementioned display section 113 with the microcomputer 125, a key matrix 136 with the reset button 107, the clock button 108, etc. and the infrared transmitter 115 which transmits infrared control signals in response to a command from the microcomputer 125.

The circuit structure of the adapter 105 is shown in FIG. 6 by way of a block diagram. As explained in connection with FIG. 4, this adapter 105 is for controlling an electrical apparatus such as the lamp 104 according to an infrared signal received from the control device 101. The adapter 105 is therefore provided with a signal receiving circuit 138 for receiving infrared light from the control device 101, a control circuit 140 for switching on and off a power relay 139 according to a control signal received through the signal receiving circuit 138, a power source 141, a connector 118 for connecting to an electrical appliance to be controlled such as the lamp 104, and a plug 117 for connecting to an external power source.

FIG. 7 is a front view of the display section 113 of the control device 101 shown in FIG. 4. The display section 113 is provided with an IN display 143 for indicating the IN mode of operation, an OUT display 144 for indicating the OUT mode of operation, a preset display 145 for indicating if an apparatus to be controlled has been selected, apparatus number displays 146, 147 and 148 for indicating which of the apparatus has been preset, rewind displays 149 and 150 for indicating the rewinding of video tape as will be explained below, a channel and numeric displays 151 and 152 for indicating a channel number, an ON time display 153 for indicating the time to start recording, to switch on the adapter 105, etc., an OFF time display 154 for indicating the time to switch off the adapter 105, etc., am and pm displays 155 and 156 for distinguishing am and pm of indicated times, a code number display 157 for lighting when a code number is entered, a numeric display section 158 for displaying time, and recording length displays 159 and 160 for indicating the recording length of the video tape recorder 103 or the duration of time in which the adapter 105 is switched on.

In the IN mode of operation, the user enters the current time by means of the clock button 108 and then the code number by the code setting button 110. The displayed apparatus number changes from 1 to 2 to 3 as the preset button 107 is operated. If the set button 112 is pressed when the number corresponding to the desired apparatus is displayed, the designated apparatus is selected and lights begin to blink sequentially, indicating what data should be entered by the user. Entry of required data is effected by means of the up-down button 111 and the set button 112. Table 2 shows by way of several examples how data are entered. In Table 2, the video tape recorder 103 and the air conditioner 106 are respectively referred to by Apparatus Nos. 1 and 2.

TABLE 2

| Example | Button operations and "displays" |
| --- | --- |
| Set time to 9:05 am | CLOCK, ±, "am 9", SET, ±, "05", SET |
| Set code number 1234 | CODE NUMBER, ±, "12", SET, ±, "34", SET |
| Select Apparatus No. 1 | PRESET, SET, "1" |
| Rewind tape | ±, "REWIND"150, SET |
| Select Channel 10 | ±, "10", SET |
| Set to start recording at 3:15 pm | ±, "pm 3", SET, ±, "15", SET |
| Set to record for 2 h 10 m | ±, "2", SET, ±, "10", SET |
| Select Apparatus No. 2 | PRESET, PRESET, SET, "2" |
| Start Apparatus No. 2 at 6:30 pm | ±, "pm 6", SET, ±, "30", SET |
| Cancel preset of Apparatus No. 1 | PRESET, "1", CANCEL |
| Cancel preset of Apparatus No. 2 | PRESET, PRESET, "2", CANCEL |

Note: "..." indicates a display, not a button to be operated.

With reference to Table 2 and FIG. 7, if the set button 112 is pressed when the apparatus number display 146 (rather than 147 or 148) is lit, Apparatus No. 1, that is, the video tape recorder 103 is selected and the displays 149, 151, 153 and 159 are lit, indicating the data which are required for presetting the video tape recorder 103. If this is an initial preset, "-" is shown in the numeric display sections 152, 158 and 160. If the video tape recorder 103 was already preset, the previously set numbers are shown in these display sections 152, 158 and 160.

Since the rewind display 150 is blinking at this moment, the set button 112 is pressed after the up-down button 111 is operated to switch on this display and to rewind the tape. If it is not desired to rewind the tape, the rewind display 150 is turned off. Next, since "1" is blinking at the numeric display 152, the user likewise operates the up-down button 111 to select a desired channel number (such as "10") and then presses the set button 112. Thereafter, hour and minute sections 158a, 158b, 160a and 160b of the displays 158 and 160 blink sequentially and each time the user operates the up-down button 111 and the set button 112 to complete presetting. As soon as the presetting is completed, the display section 113 displays the current time, and the preset display 145 and the apparatus number display 146 are lit. It goes without saying that the other apparatus can be set by following similar routines.

Basic routines for the OUT mode of operation are explained next by way of a flow chart shown in FIG. 8A-8J. Let us assume that the user has set a tape in the video tape recorder 103 (Apparatus No. 1) and switched on the lamp 104 (Apparatus No. 3) connected to the adapter 105. The user then presses the mode selecting button 102 to select the OUT mode (n101) and leaves the house. When the user, wishing to control the apparatus at home by using the telephone line 119, calls the home telephone number from outside, the telephone 121 at home rings and what takes place thereafter until the microcomputer 125 causes a verbal message to be transmitted to the caller through the voice synthesizer 129, the amplifier 130 and the interface 131, requesting an input from the caller (Steps n102 through n105) is the same as explained in connection with Steps n2 through n5 of FIG. 3.

In response to the request for an input in Step n105, the user enters the code "11#" (n106) according to the code table shown in Table 3 if the purpose of the call was to set the video tape recorder 103.

TABLE 3

| Apparatus No. | Control Code | Operation |
| --- | --- | --- |
| 0 | 0 | Cut off the telephone line |
|  | 0 | Cancel preset |
|  | 1 | Preset |
|  | 2 | Check the setting |
| 1 | 3 | Set to rewind tape |
|  | 4 | Set channel number |
|  | 5 | Set starting time |
|  | 6 | Set recording length |
|  | 0 | Cancel preset |
|  | 1 | Preset |
| 2 | 2 | Check the setting |
|  | 3 | Switch on |
|  | 4 | Switch off |
|  | 0 | Cancel preset |
|  | 1 | Preset |
| 3 | 2 | Check the setting |
|  | 3 | Switch on |
|  | 4 | Switch off |

Thereafter, the video tape recorder 103 is preset interactively between the user and the microcomputer 125. The user is sequentially asked by way of a vocal message whether the tape should be rewound (n107), which TV channel should be recorded (n111), when the recording should start (n114) and how long the recording should last (n117). When the user responds (n108, n112, n115 and n118) to each of these questions, the user's response is displayed (n109 or n110, n113, n116 and n119) for confirmation. When all data are set, a beep is heard (n120) to indicate the end. Each input is stored in the RAM 135 and the corresponding apparatus number display 146 is lit.

If the user responds with "10#" (n121) to the request in Step n105, the microcomputer 125 recognizes from Table 3 that the user's intention is to cancel the setting then in effect. If the video tape recorder 103 is already preset (YES in n122), the microcomputer 125 operates to cancel the preset data and to transmit a message to the effect to the caller (n123). If the video tape recorder 103 was not preset (NO in n122), the microcomputer 125 simply tells the user that the video tape recorder 103 was not preset (n124).

If the user's wish is simply to check how the video tape recorder is currently preset, "12#" is entered (n131). If the video tape recorder 103 is not preset (NO in n132), the user is told so (n137) and the system goes to the end of the routine (n138). If the video tape recorder 103 is preset (YES in n132), the user is told that the system is going to check the video tape recorder 103 (n133), and the system proceeds to examine if the user has requested rewinding. If there has been such a request (YES in n134), the tape is rewound and the user is told that the rewinding is taking place (n135). Thereafter, the user is told how the video tape recorder is set (n136). A beep is heard (n138) to indicate the end of the routine.

The air conditioner 103 (Apparatus No. 2) and the lamp 104 (Apparatus No. 3) can be operated similarly according to the code table (Table 3). If "21#" is entered (n141) in response to Step n105, for example, the system responds with a message, requesting an input of time (n142) and if the user makes an input (n143), the system repeats the input verbally for confirmation (n144) and the air conditioner 106 will be switched on or off when the preset time comes. If Step n105 is followed by an entry of "20#" (n151) to cancel the setting then effect for the air conditioner 106, the system proceeds as explained in connection with FIG. 8C, checking whether the air conditioner 106 has been preset or not (n152) and either cancelling the presetting and reporting that it was done (n153) or simply reporting that there was no presetting (n154). If the user, wishing to check how the air conditioner 106 is set, enters "22#" (n161) after Step n105, the system provides the requested information verbally (n163) if the air conditioner 106 has actually been preset (YES in n162). If otherwise (NO in n162), the system tells the user that Apparatus No. 2 is not preset (n164). Similarly, the user may elect to enter "23#" (n171) or "24#" (n172) after Step n105 to switch on or off the air conditioner 106. In response, the system carries out the command and tells the user that the desired operation has been done (n172 or n182). The user may have any number of these operations performed sequentially. When all desired operations are done and the user wishes to hang up, the end signal "00#" is entered (n199) according to Table 3 and this causes the system to activate the relay circuit to disconnect the telephone line 119 (n192) and sets the system ready to receive another call. Thereafter, the control device 101 transmits an infrared signal to control he video tape recorder 103, the air conditioner 106 and/or the lamp 104 at the preset time or times.

There are two types of telephones currently in use. The remote control device of the present invention is adapted to control operations of electrical apparatus by receiving tone signals and hence only a push-button type phone can be used therewith. Recently, however, a device (so-called telecommander) which transmits not only telephone numbers but also coded tone signals. If such a device is used, a remote control device of the present invention can be controlled even by a dial telephone adapted to transmit pulse signals rather than tone signals. In summary, a remote control device according to this embodiment of the present invention described above by way of FIGS. 4 through 8 have the advantage of not requiring block filters, bypass capacitors, noise filters or the like as well as unsightly cable connections with the apparatus to be controlled.

The embodiment of the present invention described above may be modified within the scope of the invention. For example, if an apparatus to be controlled in the house has a cordless remote controller, the controlling device of the present invention may be made to transmit the same control codes that are transmitted by such a cordless remote controller. FIG. 9 is a schematic drawing showing such a remote control device. For simplicity, only a video tape recorder 207 with its cordless remote controller 209 is shown as the apparatus to be controlled but the remote control system embodying this invention can be designed to control additional apparatus such as an air conditioner and a lamp as described above. This cordless remote controller 209 may be of a known type capable of not only switching on and off the video tape recorder 207 but also selecting channels, starting and ending recording and rewinding the tape by transmitting infrared light 208 (usually with wavelength about 950 nm) modulated by various command codes. When such a command code is received by the video tape recorder 207 though its light receiving section 210, it is decoded by a control circuit within the tape recorder 207 to be described below and the intended operation is carried out. In FIG. 9, numeral 204 indicates a control device connected with a telephone line 203 through a terminal 201 such as a rosette for a telephone line 202. The control device 204 according to this embodiment of the present invention is characterized as having an infrared transmitter 206 which transmits infrared light 305 identical to the aforementioned modulated infrared light 208 from the cordless remote controller 208.

FIG. 10 is a block diagram of a control system for the control device shown in FIG. 9. In FIG. 10, components which are similar or identical to those shown in FIG. 5 are indicated by the same numerals as assigned therein. FIG. 11 is a flow chart of the operation of the control system shown in FIG. 10 for the remote control device of FIG. 9. When the user calls the home telephone number from outside, the home telephone 203 rings and the microcomputer 125, having received the call signal through the signal converter 127, activates the relay 132 and transmits a message to the caller through the voice synthesizer 129, the amplifier 130 and the interface 131 to the effect that there is nobody at home to take the call (n201). Thereupon, as explained by way of FIGS. 3 and 8A, the user enters a four-digit code number followed by "#" (such as "1234#") (n202) and if a wrong code number is entered (NO in n203), the telephone line 202 is opened (n204), but if the code number is correctly entered (YES in n203), remote control is started and the user is asked whether the tape should be rewound (n205). The control system is so programmed, for example, that the user's input "1#" is interpreted as the command to rewind and "0#" as that not to rewind. Thus, the user's subsequent input of "1#" (n206) causes the transmitter 206 to transmit the same infrared signal that would be transmitted from the cordless remote controller 209 if its rewind button were pressed, thereby causing the video tape recorder 207 to start rewinding its tape. At the same time, the microcomputer 125 operates to inform the user that rewinding is taking place (n207). If the user chooses to enter "0#" (n208), the tape is not rewound and the user is informed to this effect (n209). Thereafter, the user sets the video tape recorder 207 interactively as explained above by way of FIG. 5B, that is, the user is sequentially asked to enter the TV channel number (n210), the time to start recording (n213) and the recording length (n217). After Step n210, the user enters a two-digit number followed by "#" to enter the channel number (n211) (such as "06#" to select Channel 6). After Step n213, the user enters a four-digit number followed by "#" to enter the starting time for recording (n217) (such as "2030#" to select 8:30 pm) and a two-digit predetermined code followed by "#" (n215) (such as "99#") to start recording immediately. After Step n217, the user enters a two-digit or three-digit number followed by "#" to enter the recording length (n218) (such as "120#" to select 120 minutes). After each time the user's input ends with "#", a message is transmitted back to the user confirming the user's command (n212, n215, n216 and n219). Unless all data have been correctly entered (NO in n220), the system goes back to Step n205. If all data have been correctly entered, the system repeats the input data for confirmation (n221). If the user wants to make a correction at this point, a predetermined code (such as "1#") is entered (n222) and the system returns to Step n205. If the user is satisfied with the recitation, another predetermined code (such as "#") is entered (n223), causing the system to respond with a signal (such as "ding-dong") indicating the end of the routine. Thereafter, the user may enter a predetermined end command (such as "00#") to disconnect the telephone line 202 (n225). Even if the user fails to enter this command (NO in n225), the microcomputer 125 is so programmed that the telephone line 202 is automatically opened (n227) if there is no input from the user within 30 seconds, or any predetermined time interval. When the set time arrives, the microcomputer 125, having a clock within itself, causes the infrared transmitter 206 to transmit signals to the video tape recorder 207 sequentially to turn on its power, to rewind the tape if there is a command to do so to start recording, to end recording and to finally switch off the power. The channel and time data for the operation are stored in the RAM 135.

FIG. 12 is a time chart showing the operations described above. With reference to FIG. 12, A and B respectively indicate an outside telephone and the control device 204. C and D represent the video tape recorder respectively when it is preset and when recording is started immediately. When a command is communicated (a) through the telephone line 202, the content of this command is stored (b) and transmitted as an infrared signal to the video tape recorder 207 (e). If the command is to rewind the tape, the video tape recorder 207 is immediately switched on but rests after the tape is rewound (h). When a signal for starting to record (c) is transmitted from the infrared transmitter 206 in response to a signal from the microcomputer 125, an infrared signal is similarly transmitted (f) and the video tape recorder 207 is switched on again (i) and recording is started (j).

At a later time according to the recording length which has been set, another signal for ending the recording and to switch off the video tape recorder 207 is similarly transmitted (d and g) and the recording is stopped and the video tape recorder 207 is switched off (k). If the command was to immediately start recording, the video tape recorder 207 is immediately switched on (l) and recording is started as soon as the tape is rewound.

The description of the present invention given above by way of FIGS. 9–12 is not intended to be limitative. For example, the infrared transmitter 206 need not transmit exactly the same beam as transmitted from the cordless remote controller 209. The video tape recorder 207 is generally provided with a narrow band filter circuit in order to distinguish the infrared control signal 208 from randomly scattered external light. For example, the filter circuit may pass only at 30 kHz and the beam which is passed later demodulated and is received as the control code by the control circuit including the microcomputer 125. Accordingly, even if the control code of the cordless remote controller 209 for the video tape recorder 207 is different from that of the control device 204, the microcomputer 125 can be programmed to treat them as the same code as long as the carrier frequencies are the same. If the cordless remote controller 209 typically transmits a carrier wave of 38-40 kHz modulated by control codes, the control device 204 according to the present invention causes the infrared transmitter 206 to transmit infrared light of the same carrier frequency modulated by desired control codes.

Although remote controller systems using infrared light have been considered above, similar systems can be easily realized by using supersonic waves. In such a system with apparatus equipped with a cordless indoor remote controller using supersonic waves, the infrared transmitter 206 of FIG. 9 is replaced by a supersonic wave transmitter. In such a system embodying the present invention, the carrier frequency of the waves from the supersonic wave transmitter must be the same as the carrier frequency transmitted from the cordless remote controller adapted to transmit supersonic waves to control apparatus.

A remote controller device of the type described above is convenient because various electrical apparatus in the house can be controlled without crowding the house with unsightly cables. If it is desired to control two or more apparatus by means of a single control device of this type, however, all apparatus to be controlled must be placed relatively near to one another such that the beams from a single transmitter 206 can reach all of them. In other words, a device of the type described immediately above cannot control a plurality of apparatus at different parts of a house. A remote control device according to another embodiment of the present invention which can control not only apparatus located in different rooms but also those at different places within the same room is described next by way of FIG. 13-16.

In FIG. 13, which schematically shows another remote control device embodying the present invention, components which are similar or identical to those described above by way of FIG. 9 are indicated by the same numerals (201-210) as assigned therein. The remote control device according to this embodiment is characterized, as explained above, as being able to control two or more apparatus which may not be reachable by a single infrared transmitter. Thus, FIG. 13 shows a control device 204 controlling a video tape recorder 207 which is relatively close-by as described in FIG. 9 and additionally an air conditioner 267 at some distance away with its own cordless remote controller 269 and light receiving section 270. The control device 204 shown in FIG. 13 is characterized as having a connector 257 in addition to the infrared transmitter 206 adapted to transmit infrared signals with the same carrier frequency as transmitted from the tape recorder's remote controller 209. The connector 257 is for connecting the control device 204 with an auxiliary infrared transmitter 259 through a signal line 260 equipped with a plug 261. The auxiliary transmitter 259 is designed to transmit infrared light 258 which is identical to the light 205 transmitted by the main transmitter 206 or may have the same carrier frequency. The air conditioner 267 is so designed that its remote controller 269 can not only switch it on and off but control various conditions such as temperature and wind velocity by transmitting infrared light signals 268 which are received and decoded by a control circuit including a microcomputer. The control device 204 is thus so designed not only as to cause its infrared transmitter 206 to transmit infrared signals 205 to the video tape recorder 207 with the same carrier frequency as transmitted from the remote controller 209 for the video tape recorder 207 but also to cause the auxiliary transmitter 259 to transmit infrared signals 258 to the air conditioner 267 with the same carrier frequency as transmitted from the remote controller 269 of the air conditioner 267.

In FIG. 14 which is a block diagram of the control system of the control device 204, components which are identical or similar to those described above by way of FIGS. 5 and 10 are indicated by the same numerals. This control system is characterized as having its microcomputer 125 also to control the auxiliary transmitter 259 by sending a control signal to the latter to cause infrared light signals 258 to be transmitted to the air conditioner 267. Numeral 151 indicates a switch section which may be attached to the back surface of the housing of the control device 204 and serves to allow each user to decide which infrared transmitter (main transmitter 206 or auxiliary transmitter 259) should transmit which kind of control signals. The user of the system shown in FIG. 13, for example, will operate this switch section 151 such that the main transmitter 206 transmits code signals for the video tape recorder 207 and the auxiliary transmitter 259 transmits code signals for the air conditioner 267. An advantage of having such a switch section 151 is that the main transmitter 206, for example, transmits light only when the microcomputer 125 sends out a signal addressed to the video tape recorder 207. Although transmission of a signal addressed to the air conditioner 267 from the main transmitter 206 does not cause any error from the point of view of operation, the switch section 151 serves to prevent waste of battery power by useless light emission.

The flow chart of FIG. 11 substantially represents the operation of the control system of FIG. 14. Since the flow chart of FIG. 11 is for a control system which controls only one apparatus (that is, a video tape recorder) but the control system of FIG. 14 controls both a video tape recorder and an air conditioner according to the illustrated application, the user is asked after entering a correct code number (after YES in Step n203) which of the apparatus is to be controlled (n251 in FIG. 15). If the user subsequently enters "1#" (n252), indicating that Apparatus No. 1 which is the video tape recorder 207 is to be controlled, the system responds with a message to the effect that the video tape recorder is going to be set (n253) and proceeds to Step n205 of FIG. 11. If the user enters "2#" (n252) instead, indicating that Apparatus No. 2 which is the air conditioner 267, is to be controlled, the system tells the user that it is the air conditioner that is going to be set (n254) and asks whether its switch-on time or the switch-off time is going to be set (n255). The user thereupon enters "1#" to indicated that it is the switch-on time that is to be set or "0#" to indicate that it is the switch-off time (n256). In order to avoid an error, the system again repeats the user's selection and requests the next input (n257 or n258). As explained above by way of FIG. 11, the user may enter a four-digit number and "#" (such as "2030#" to indicate 8:30 pm to preset the air conditioner 267) or a predetermined code such as "99#" to request that the air conditioner 267 be immediately switched on or off (depending on the command in Step n256) (n259). The system repeats the user's command (n260 or n261) for confirmation and proceeds to Step n225 or n226 of FIG. 11. It goes without saying that the program shown by the flow charts of FIGS. 11 and 15 is but one example. A routine for allowing the user to make corrections (like Steps n220 through n223) may be included after Steps 260 and 261.

If the user enters "1#" in Step n252, the system operates generally according to the time chart of FIG. 12. If "0#" is entered in Step n252, the subsequent operation of the system is depicted by the time chart of FIG. 16 wherein A and B again indicate the outside telephone from which a call is received and the control device 204, respectively, and E and F both represent the air conditioner 267 respectively when it is preset and when it is switched on with the entry of the command "99#" in Step n259. When a command is received from an outside telephone (m), it is stored in the RAM 135 (n). If the command is to switch on the air conditioner 267 immediately, a command to this effect is transmitted from the auxiliary transmitter 259 (p) and the air conditioner 267 is switched on immediately (s). If the command received by the control device 204 is to switch on the air conditioner 267 at a certain later time, the control device 204 is switched off until the set time arrives (o). Then a switch-on signal is likewise transmitted from the auxiliary transmitter 259 (q) and the air conditioner 267 is switched on (r).

Advantages gained by and means that can be employed to realize a remote control system described above are by no means limited by the example illustrated above by way of FIGS. 13 through 16. Such a system can be used equally effectively to control lamps, a water heater, cooking apparatus, etc. As taught in connection with another embodiment of the present invention described above, supersonic waves may be used instead of infrared light to transmit signals by matching the carrier wave frequency of the transmitter with that from the cordless remote controller associated with the apparatus to be controlled.

Various remote control devices embodying the present invention disclosed above are frequently connected on the same telephone line with another automatic responding device such as an answering machine. If such an answering machine is set to respond after detecting a smaller number of dial tones than the remote control device on the same telephone line, incoming calls cannot be taken by the remote control device. A remote control device of still another type embodying the present invention with which this kind of problem can be eliminated is described below by way of FIGS. 17 through 20.

With reference to FIG. 17 which is a schematic drawing for showing how a remote control device according to this embodiment of the present invention is connected to a telephone line 302 through a terminal 301 such as a rosette, numeral 303 indicates an answering machine (ANS. MACH.) of a known type with automatic responding capability and numeral 304 indicates a remote control device for controlling the operations of apparatus in the house such as a video tape recorder 305, an air conditioner 206, and a lamp 307. FIG. 18 shows how a control panel 308 of the control device 304 may look with a time display section 309 for displaying month, day, time and day of the week, a mode switch 310 for selecting between the IN and OUT modes explained above, mode display lamps 311 and 312 showing which of the aforementioned two modes has been selected, remote control switches 313, 314 and 315 for switching the apparatus 305, 306 and 307 on and off by remote control, apparatus indicating lamps 316, 317 and 318 for showing how the remote control switches 313, 314 and 315 have been operated and a code switch 319 for operating the device 304.

With reference next to FIG. 19 which is a block diagram of the control system of the remote control device 304, numeral 351 indicates a microcomputer for controlling various signals, numerals 352 indicate terminals for connection to the telephone line 302 and numerals 353 indicate terminals for connection to the answering machine 303. When a call is received from outside, call signals with frequency of 16 Hz are transmitted with 2-second intervals through the line 302, a capacitor 355 and a resistor 356. Numeral 354 indicates a signal detector which serves to rectify these call signals and transmit them to the microcomputer 351 through a photocoupler. Numeral 357 indicates a tone signal receiver which receives the tone signals transmitted through the telephone line 302, the capacitor 355 and the resistor 356 during wait periods. Numeral 358 indicates a connector circuit which connects and disconnects the control device with and from the telephone line 302 by the operation of a relay to transmit sound and other signals through a transformer for signal transmission. Numeral 359 indicates a tone decoder which decodes the multifrequency signals sent telephonically from outside through the telephone line 302, the connector circuit 358 and an amplifier 360 and transmits them to the microcomputer 351. If a DTMF signal synthesized from two frequencies is received, this tone decoder 359 makes use of filters to detect the frequencies of the input signals, thereby determining which of the numeric buttons, "*" or "#" has been pressed by the caller. For example, "1" may be identified from frequencies 697 Hz and 1209 Hz, "2" from 697 Hz and 1336 Hz, "3" from 697 Hz and 1477 Hz, "4" from 770 Hz and 1209 Hz, "5" from 770 Hz and 1337 Hz, "6" from 770 Hz and 1477 Hz, and so forth. Numeral 361 indicates a voice synthesizer of a kind described above, numeral 362 indicates an amplifier for amplifying voice signals transmitted from the voice synthesizer 361, and numeral 363 indicates a relay control circuit which controls the relay junctions 363a in response to an input from the microcomputer 351 to connect the telephone line 302 either to the answering machine 303 through the terminals 353 or to the connector circuit 358. Numeral 364 indicates means for controlling the apparatus 305, 306 and 307, numeral 365 indicates means for setting a mode of operation, parameters and the like for the microcomputer 351, numeral 366 indicates means for registering a code number in the microcomputer 351 and numeral 367 indicates a power source such as batteries.

FIG. 20 is a flow chart of the operation of the control system described above by way of FIG. 19. If a call is received during an OUT mode of operation (n301), the signal detector 354 detects the call signals and transmits a signal to this effect to the microcomputer 351. Let us assume that it has previously been set through the parameter setting means 365 that connection be made after the seventh call signal (dial tone) is received. Thus, after the seventh call (YES in n302), the microcomputer 351 causes the telephone line 302 to be closed (n303) and a message is transmitted from the voice synthesizer 361 through the voice amplifier 362 and the connector circuit 358 to the caller that there is nobody at home (n304). Thereafter, if a code number (such as "1234#") is entered, the input code is received by the microcomputer 351 through the amplifier 360 and the tone decoder 359. The microcomputer 351 compares the received code with the correct code preset by the parameter setting means 365 and if they match (YES in n305), a message to the effect (such as "ding-dong") is likewise sent to the caller (n306). The caller is allowed to enter a code number up to three times (according to the illustrated embodiment). After three consecutive entries of incorrect code numbers (n307), the telephone line 3002 is disconnected (n308). After a correct code is entered, the caller is able to control the apparatus by entering appropriate preset control codes as explained above in connection with other embodiments of the present invention (n309 and n310) and the telephone line 302 is opened (disconnected) if a predefined end signal such as "00#" or a predetermined time period (such as 30 seconds) passes without an input (n311 and n312).

Assume, next, that an answering machine 303 is connected through the terminals 353 and that the relay junctions 363a are connected to the terminals 353. Assume, furthermore, that this answering machine 303 is set to respond after the fourth call signal is received. If a call is received under these conditions, the answering machine responds after the fourth call (YES in n315) while the microcomputer 351 is still counting and not ready to respond yet (NO in n302). Thereafter, the caller hears a message from the answering machine 303 to the effect that it is the answering machine that is answering. At this moment, the telephone line 302 is disconnected from the connector circuit 358 but is connected to the microcomputer 351 through the capacitor 355, the resister 356 and the tone signal receiver 357. Thus, the user, wishing to control one or more of the apparatus 305, 306 and 307 rather than to leave a message in the answering machine 303, enters a predetermined command signal (such as "00#") for making a switch to the remote control device 304 and this signal is received by the microcomputer 351 through the tone signal receiver 357, the amplifier 360 and the tone decoder 359 (YES in n316). Thereupon, the microcomputer 351 transmits signals to cause the relay junctions 363a to connect the connector circuit 358 to the telephone line 302 (n317) and to inform the caller that the remote control device is ready to receive a control command (n318). If the caller fails to respond within a predetermined length of time after Step n315, the system is disconnected (YES in n319).

The remote control system disclosed above can be further modified such that the user, calling in from outside, can operate the apparatus by remote control even if somebody at home not familiar with the operation of such apparatus happens to take the call by lifting the receiver before the telephone line has the time to become connected to the remote control device. Such a modified remote control device is generally connected as shown in FIG. 21 wherein components identical or similar to those shown in FIG. 17 are indicated by the same numerals and numeral 300 indicates a telephone. The control panel of such a remote control device may look nearly exactly as shown in FIG. 18 (and hence is not shown by a separate drawing) except there is provided a switch for connecting the microcomputer 351 with the telephone line 302 even if the receiver of the connected telephone 300 has been lifted. The control system of this remote control device may therefore be structured nearly identically to that shown in FIG. 19 (and hence is not shown by a separate block diagram) except the microcomputer 351 is provided with the aforementioned switch. With a switch of this type provided, the user can telephonically control the apparatus at home even if the call is taken before the remote control device initially has the time to respond. In summary, if the user calls the phone number with the intention of controlling apparatus at home and the call is taken by a person, the user can ask that person to press the switch such that the remote control device can be accessed. Once the remote control device is reached, its microcomputer proceeds, as described above in connection with other types of control devices embodying the present invention, to control desired apparatus according to the control signals transmitted telephonically by the user.

With the type of remote control devices described above which transmit control signals by infrared light or similar means, the user is generally required to place the signal transmitter and apparatus to be controlled in such a way that there are no obstacles on the light paths. Another remote control device of the present invention described below by way of FIGS. 22 through 24 is characterized as enabling the user to easily ascertain the absence of obstacles which may prevent intended remote control of apparatus. FIG. 22 is a conceptual drawing showing how a remote control device 404 with the aforementioned capability may be connected to a telephone line 402 in parallel relationship with a telephone 403 through a terminal 401 such as a rosette. Numerals 407 and 408 indicate two of the apparatus to be controlled by infrared signal light 405 transmitted from the control device 404. FIG. 23 is a schematic front view of a part of the control device 404 showing an infrared light emitting part 406 comprising, for example, an infrared light emitting diode. Numeral 409 indicates a mode selection switch for selecting between the IN and OUT modes of operation explained above. Numeral 410 indicates a test key, the functions of which are explained below in detail.

The control system of the control device 404 can be described by a block diagram nearly identical to FIG. 10 (and hence is not shown by a separate drawing) except the mode selection switch 409 and the test key 410 are provided to the microcomputer 125. FIG. 24 is a schematic circuit diagram of the infrared light transmitting part 406 of FIGS. 22 and 23, characterized as having two output ports 422 and 423 through which current is supplied to an infrared emitting diode 425. The microcomputer 125 is programmed to operate in such a way that current is supplied to the diode 425 through the first output port 422 if the test key 410 is not pressed but through the second port 423 and a drop resister 424 if the test key 410 is pressed. In other words, if the test key 410 is pressed to operate the system in a test mode, light emitted from the diode 425 is weaker than in the regular mode of operation. Thus, different control codes are transmitted from the infrared transmitter 406, depending on whether the test key 410 is pressed or not. For example, a signal to switch on a specified apparatus such as an air conditioner may be transmitted in the regular mode and a next signal to switch it off may be transmitted by pressing the test key 410.

The test key operation as explained above is particularly convenient when the device is powered by batteries (POWER 137 of FIG. 10, for example, representing batteries) because the output from the infrared transmitter 406 inevitably drops as the batteries become old. If the test key 410 is used when the system is initially set up or when batteries are exchanged, the user can reliably ascertain the working conditions by observing the operations of the apparatus.

The foregoing description of preferred embodiments of the invention has been presented for purposes of illustration and description. It is not intended to be exhaustive or to limit the invention to the precise form disclosed. For example, control devices of various designs have been presented above in FIGS. 1, 4, 9, 13 and 22 but they are not necessarily intended to show ideal or preferred designs. FIG. 25 is a perspective view of a control device of the present invention according to another design wherein numeral 441 indicates a housing, numeral 442 indicates a transmitter means for transmitting infrared light or supersonic waves which carry control signals for controlling apparatus and numeral 443 indicates a display means for displaying parameters such as temperature, the mode of operation and so forth. Since the control devices of the present invention are generally intended to control more than one apparatus, unlike a typical cordless remote controller adapted to be held in hand and to control only one apparatus, it is common to include many light emitting diodes, for example, as partially shown in FIG. 25. Since the control device may be attached in a vertical position on a wall as shown in FIG. 26 or placed on a table as shown in FIG. 27 by making use of a foldable leg 445 and since air conditioners are usually placed at a high position while video tape recorders are placed relatively near the floor, the light emitting diodes should be positioned to emit light in practically all directions. In FIGS. 26 and 27, arrows A', B', C' and D' show likely directions in which light will have to be emitted to reach the air conditioner to be controlled and arrows E' and F' likewise show likely directions to the video tape recorder. If too many light emitting diodes are used in the transmitter section 442, however, the device as a whole becomes unreasonably costly and its rate of power consumption too high. A control device embodying the present invention described below by way of FIGS. 28 through 34 is therefore characterized as having its infrared transmitter assembly made removable from its housing.

With reference initially to FIG. 28 which is its front view and FIG. 29 which is a sectional plan view of a part thereof taken along the line X—X' of FIG. 28, a first transmitter assembly 508 and a second transmitter assembly 509 are disposed on top of a horizontal upper wall 502 of its housing 501. As shown in FIGS. 30 and 31 which are schematic drawings of sectional views of these transmitter assemblies 508 and 509, respectively, infrared light emitting diodes 504, 505, 506 and 507 for emitting infrared signals to control apparatus are contained in these transmitter assemblies 508 and 509. Each transmitter assembly 508 and 509 is removably secured to an attachment part 503 of the upper wall 502 by screw means 510. Numeral 511 of FIG. 30 indicates a spring or providing a biasing force to the first transmitter assembly 508 such that the latter can assume an evenly horizontal position when attached to the housing 501. A similar spring is also provided to the second transmitter assembly 509, although not shown in FIG. 31. With reference to FIG. 28, numeral 513 indicates a display section on the front panel 512 of the housing 501. Numeral 516 indicates a modular cord connecting the housing 501 with a telephone line. With reference to FIG. 29, numeral 515 indicates means for attaching the housing 501 to a wall 514 and numerals 518 indicate signal lines connecting the light emitting diodes 504, 505, 506 and 507 with the housing 501. These signal lines 518 are normally stored inside the housing 501 but are long enough so that the transmitter assemblies 508 and 509 can be removed from the housing 501 and placed at positions which are convenient for reaching the apparatus to be controlled.

As shown in FIG. 30, the two light emitting diodes 504 and 505 in the first transmitter assembly 508 are attached to a horizontal supporting member 517 in such ways that they emit light in upward directions with respect to the horizontal plane passing through their centers. The two light emitting diodes 506 and 507 in the second transmitter assembly 509, as shown in FIG. 31, are likewise attached to a similar supporting member 519 in such ways that they emit light in downward directions with respect to the horizontal plane passing through their centers. FIG. 32 shows the vertical ranges of angles in which the four light emitting diodes 504, 505, 506 and 507 emit light. In FIG. 32, numerals 504, 505, 506 and 507 represent the vertical ranges of angles of the light emitting diodes indicated by the same numerals. FIG. 33 shows the horizontal angular range in which these light emitting diodes 504, 505, 506 and 507 can emit light.

The control device described above can be used with both its transmitter assemblies 508 and 509 attached to its housing 501 as shown in FIG. 28. In this situation, the screw means 510 are loosened and the assemblies 508 and 509 are adjustably rotated such that light emitted from them will reach the apparatus to be controlled. Thereupon, the screw means 510 are tightened so that the transmitter assemblies 508 and 509 will maintain their adjusted angular orientations.

Alternatively, one or both of the transmitter assemblies 508 and 509 may be removed from the housing 501. For this purpose, the corresponding screw means 510 is removed and the signal lines 518 are taken out of the housing 501 and stretched. FIG. 34 shows how the first transmitter assembly 508, thus disengaged and separated from the housing 501, may be secured by means of an attachment piece 520 to another wall 521 at such a position that the apparatus intended to be controlled by light from the light emitting diode 504 or 505 can be reached more easily. After the assembly 508 is attached to the wall 521 as shown, the direction of the light emitting diodes is adjusted and the screw means 510 is fastened.

With a control device of the type described above, apparatus which are not in the same room as the control device can be reliably controlled by removing one of the assemblies from the housing and securing it at a position from where the apparatus to be controlled is more easily reached. With light emitting diodes positioned as described above, infrared light can be transmitted effectively into a wide range of directions. Although a control device using infrared light to transmit control signals has been disclosed by way of an example, control devices of this type can be realized equally easily with supersonic wave transmitters.

A control device of still another type according to the present invention is characterized as having a relatively small number of light emitting diodes affixed to a rotatably supported plate such that the user can adjust their orientation appropriately according to the position of the apparatus to be controlled. With reference to FIG. 35 which is a front view of this control device, numeral 551 indicates a housing for the device with a filter 552 covering a transmitter assembly contained inside. The filter 552 must be large enough and so shaped that light can be transmitted in a wide range of angles. Inside the filter, there are also a display section 555 for displaying numeric data such as time and indicator lamps 556 for indicating the mode of operation such as the IN and OUT modes explained above. The filter 552 is made thinner in front of these display means such that light from the display section 555 and the indicator lamps 556 can be seen from outside. The other parts of the filter is preferably made of a material transmissive to infrared light but not to visible light such that the components installed inside the housing 551 cannot be seen from outside. Numeral 557 indicates a switch for selecting between the IN and OUT modes of operation. Although not shown in FIG. 35, the housing 551 is further provided with switches for setting various times and a code number, and a filter 552 is provided with knobs 558 for changing the directions of emitted light. An arrow 559 is marked on each of these knobs 558 to indicate the direction of emitted light controlled by the corresponding knob. The number of knobs 558 (two shown in FIG. 35) is the same as that of apparatus to be controlled by this control device.

The interior of the filter 552 is described next by way of FIG. 36 which is a schematic sectional view of a part of the control device shown in FIG. 35. The filter 552, which engagingly covers the housing 551, has an annular guide 560 protrudingly formed on its inside surface corresponding to each knob 558 which rotates therealong. The knob 558 is formed with claws 564 and screws 571 for securing a printed circuit board 563 on which are affixed, as shown also in part in FIG. 37, infrared light emitting diodes 561a, 561b and 561c and resistors 562. As shown in FIG. 38 which is a rear view of the knob 558, the printed circuit board 563 is secured by means of three claws 564 and four screws 571. The three light emitting diodes 561a, 561b and 561c are attached to the board 563 at different angles. According to the particular embodiment of the present invention illustrated in FIGS. 36 and 37, the diodes 561a and 561b make acute angles with the board 563 but the third diode 561c is attached nearly perpendicularly to the board 563. Spacers (not shown) may be incorporated in order to accurately adjust these angles.

The board 563 is also provided with holes 570 for inserting the knob 558 therethrough. On its printed surface are two electroplated annular contacts 565a and 565b. Numeral 566 indicates a board for the housing circuit and is secured to a main frame by screw means. Elastic contact pieces 568a and 568b are soldered to this board 566 for establishing electrical contacts with the aforementioned contacts 565a and 565b. The board 566 is also provided with a hole 569 to make a room for the claws 564 as well as lead lines for the light emitting diodes 561a, 561b and 561c and the resistors 562. The knob 558 is formed with a sliding surface 572 as shown in FIG. 38 for sliding it against the guide 560 and has an opening in the direction in which light is transmitted. The filter 552 is also made thinner corresponding to this opening such that the intensity of transmitted infrared light is not reduced significantly thereby. The guide 560 is also made less protruding corresponding to this opening part of the knob 558. FIG. 39 is a circuit diagram showing how the three light emitting diodes 561 and the resistors 562 become electrically connected to their driving circuit through the connections between the contact 565a and the piece 568a and between the contact 565b and the piece 568b.

With a control device described above, the user can rotate the knobs 558 to control the directions of the light emitting diodes 561a, 561b and 561c which are attached at varying angles. Thus, infrared light can be transmitted directly to nearly hemispherical directions and this improves the degree of freedom in selecting a position for installing the control device. Moreover, a control device according to this embodiment of the present invention is economical to operate because light emitting diodes need not be installed wastefully by emitting light in directions where no apparatus are required to be controlled. In other words, light energy is used efficiently and in concentrated manners and hence the reliability of control is improved.

As stated repeatedly throughout the disclosure given above, the present invention has been disclosed above by way of only selected embodiments. Many modifications and variations thereon are conceivable. In particular, the number of apparatus to be controlled can be freely varied. Instead of infrared light, any cordless signal transmission method may be used such as supersonic waves. Such modifications and variations which may be apparent to a person skilled in the art are intended to be within the scope of this invention.

What is claimed is:

1. A remote control device comprising
   memory means for storing data transmitted through a telephone line for the operation of selected apparatus,
   control means for controlling said selected apparatus according to said data stored in said memory means, said control means including an infrared light transmitter and controlling said selected apparatus according to said data by transmitting control signals to said apparatus through said infrared light transmitter, and
   testing means for testing whether said infrared signal light transmitter is properly functioning for the purpose of remote control, said testing means including means for selecting one of a plurality of ports through which current passes to said infrared light transmitter.

2. A remote control device comprising
   memory means for storing data transmitted through a telephone line for the operation of selected apparatus,
   control means for controlling said selected apparatus according to said data stored in said memory means, said control means controlling said selected apparatus according to said data by transmitting control signals to said apparatus through cordless transmitting means, said control means including a signal transmitter assembly having a plurality of wave emitters affixed at different vertical angles with respect to a rotatably supported horizontal board.

3. The remote control device of claim 2 wherein said control signals have the same frequency as signals adapted to be transmitted from a cordless remote controller for controlling the operation of said selected apparatus.

4. The remote control device of claim 2 wherein said control means include a main transmitter assembly and a connecting means for connecting an auxiliary transmitter assembly which is equivalent to said main transmitter assembly.

5. The remote control device of claim 2 wherein said transmitter assembly also has knob means for controllably rotating said horizontal board.

6. The remote control device of claim 1 further comprising a microcomputer and a signal converter for converting incoming signals received through said telephone line and converting said incoming signals into a form acceptable to said microcomputer.

7. A remote control device for controlling operating conditions of apparatus on the basis of data transmitted through a telephone line, said device comprising
   memory means for storing a preselected access code and control data,
   clock means for counting time,
   controlling means programmed to output a detection signal when the number of call signals sequentially received through a telephone line has reached a predetermined number of times, to thereafter accept an access code inputted in response to said detection signal, to output an agreement signal if said accepted access code matches a preselected access code stored in said memory means, to cause control data for selected apparatus to be received by said remote control device in response to said agreement signal, to store said received control data in said memory means, and to output a control signal for controlling operations of said selected apparatus according to said control data by comparing time data received from said clock means and said control data, and
   an infrared transmitter assembly connected to said controlling means to receive said control signal and to transmit infrared control signals for controlling operations of said selected apparatus, said infrared transmitter assembly including a plurality of wave emitters affixed at different vertical angles with respect to a rotatably supported horizontal board.

8. The remote control device of claim 7 further comprising a voice synthesizer connected to said telephone line for transmitting a request message through said telephone line.

9. The remote control device of claim 7 wherein said infrared control signal has the same frequency as signals selected to be transmitted from a cordless remote controller for controlling said selected apparatus.

10. The remote control device of claim 7 further comprising testing means for testing whether said infrared transmitter assembly is properly functioning for the purpose of remote control.

11. The remote control device of claim 10 wherein said testing means include means for selecting one of a plurality of ports through which current passes to said infrared transmitter assembly.

12. The remote control device of claim 1 wherein
   said memory means also stores a preselected access code, and
   said control means is programmed to output a detection signal when the number of call signals sequentially received through said telephone line has reached a predetermined number of times, to thereafter accept an access code inputted in response to said detection signal, to output an agreement signal if said accepted access code matches said preselected access code stored in said memory means, to cause control data for selected apparatus to be received by said remote control device in response to said agreement signal, to store said received control data in said memory means, and to output a control signal for controlling operations of said selected apparatus according to said control data.

13. The remote control device of claim 12 further comprising a voice synthesizer connected to said telephone line for transmitting a request message through said telephone line.

* * * * *